US006953169B2

(12) United States Patent
Morita et al.

(10) Patent No.: US 6,953,169 B2
(45) Date of Patent: Oct. 11, 2005

(54) MAGNETIC TAPE CARTRIDGE

(75) Inventors: Kiyoo Morita, Kanagawa-ken (JP); Hideaki Shiga, Kanagawa-ken (JP); Yusuke Ishihara, Kanagawa-ken (JP); Daisuke Takahashi, Kanagawa-ken (JP); Takuji Daihisa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 8 days.

(21) Appl. No.: 10/673,443

(22) Filed: Sep. 30, 2003

(65) Prior Publication Data

US 2004/0061016 A1 Apr. 1, 2004

Related U.S. Application Data

(62) Division of application No. 09/856,308, filed as application No. PCT/JP99/06278 on Nov. 11, 1999.

(30) Foreign Application Priority Data

Nov. 20, 1998 (JP) ............................................ 10-331296

(51) Int. Cl.[7] ............................................. G11B 23/07
(52) U.S. Cl. ...................... 242/326.2; 242/348; 360/132
(58) Field of Search ............................ 242/326, 326.1, 242/326.2, 348, 348.2; 360/132, 133; 369/291

(56) References Cited

U.S. PATENT DOCUMENTS

| | | | | |
|---|---|---|---|---|
| 3,861,611 A | * | 1/1975 | Esashi et al. | ............. 242/326.2 |
| 4,045,821 A | * | 8/1977 | Fujikura | ..................... 360/132 |
| 6,003,802 A | | 12/1999 | Eaton et al. | |
| 6,125,012 A | * | 9/2000 | Miyazaki et al. | ........... 360/132 |
| 6,264,126 B1 | | 7/2001 | Shima et al. | |
| 6,345,779 B1 | | 2/2002 | Rambosek | |
| 6,435,439 B1 | | 8/2002 | Ishihara et al. | |
| 6,445,539 B1 | | 9/2002 | Morita et al. | |
| 6,505,789 B2 | | 1/2003 | Ridl et al. | |
| 6,628,479 B1 | * | 9/2003 | Rambosek | ................... 360/132 |
| 6,702,216 B2 | * | 3/2004 | Shima et al. | ............. 242/348.2 |
| 2002/0047063 A1 | * | 4/2002 | Kaneda et al. | .............. 242/348 |
| 2002/0179764 A1 | * | 12/2002 | Yamamoto et al. | ...... 242/348.2 |

FOREIGN PATENT DOCUMENTS

| | | |
|---|---|---|
| JP | 9-274785 | 10/1997 |
| JP | 11-232828 | 8/1999 |

OTHER PUBLICATIONS

Chinese Office Action Jan. 9, 2004.
Abstract 11–232828, Aug. 27, 1999.

* cited by examiner

*Primary Examiner*—William A. Rivera
(74) *Attorney, Agent, or Firm*—Sughrue Mion, PLLC

(57) ABSTRACT

Disclosed herein is a magnetic tape cartridge in which reliability has been enhanced by preventing a thin insertion-guide portion, provided in an opening for guiding a leader pin, from being deformed due to shock produced by dropping, etc. The magnetic tape cartridge has a cartridge case 4 in which a single reel with magnetic tape 6 wound thereon is rotatably housed. In an opening 10 through which a leader member 5 rigidly attached to the leading end of the magnetic tape 6 is pulled in and out, an insertion-guide portion 21 for guiding an end portion of the leader member 5 is formed by making the case wall surface thin, and a cutout is provided on at least one side of the insertion-guide portion 21 at a position of an edge of the opening 10.

2 Claims, 20 Drawing Sheets

F I G. 34
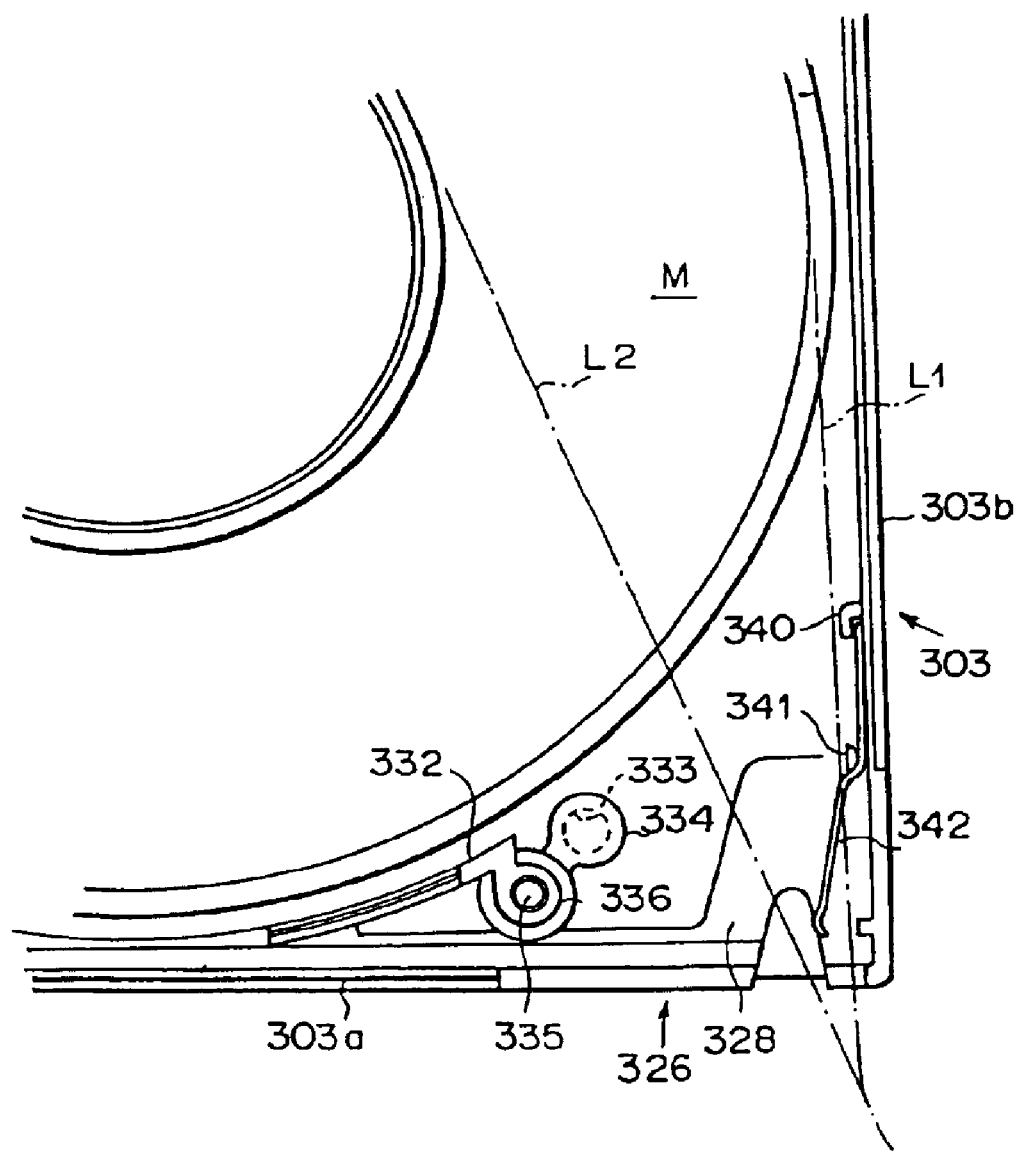

MAGNETIC TAPE CARTRIDGE

This is a divisional of application Ser. No. 09/856,308 filed May 21, 2001 now abandoned, which is a National Stage Application filed under §371 of PCT Application No. PCT/JP99/06278, filed Nov. 11, 1999; the disclosure of all of which is incorporated herein by reference.

TECHINICAL FIELD

The present invention relates to a magnetic tape cartridge and more particularly relates, in a magnetic tape cartridge where a single reel with magnetic tape wound thereon is rotatably housed within a cartridge case and where a leader member such as a leader pin is rigidly attached to the leading end of the magnetic tape to pull out the magnetic tape, to the structure of a cartridge case opening through which the leader pin is pulled in and out of the cartridge case.

BACKGROUND ART

In magnetic tape cartridges, which are being used as storage media that are employed in external storage units for computers, etc., there is known a type where a single reel with magnetic tape wound thereon is rotatably housed within a cartridge case. This magnetic tape is employed to archive data for computers, etc. Since important information has been stored, the magnetic cartridge is constructed so that problems, such as tape jamming, etc., do not occur and that the magnetic tape is not pulled out of the cartridge case unexpectedly.

In addition, a leader member such as a leader pin is rigidly attached to the leading end of the magnetic tape, and a drive unit is constructed so that the leader pin is pulled out at a recording-reproducing unit to forward or rewind the magnetic tape. The leader member is pulled in and out of the cartridge case through an opening formed in the cartridge case. In the opening, it is preferable to make the case wall thin and form an insertion-guide portion for leading in and guiding the end portion of the leader member so that the pulling-in-and-out of the leader member can be easily performed.

Hence, the aforementioned magnetic tape cartridge has the disadvantage that the insertion-guide portion will be deformed and damaged by shock produced due to dropping of the magnetic tape cartridge.

More specifically, as illustrated in FIG. 35, an opening 10 in a generally rectangular cartridge case 4, for pulling in and out a leader member (or a leader pin) 5 rigidly attached to the leading end of magnetic tape, is formed in the side surface, near corner portions 4a, of the case 4. The top and bottom wall surfaces inside the opening 10 are provided with housing recesses 20 in which the upper and lower ends of the leader member 5 are inserted and retained. Insertion-guide portions 21 are provided from the housing portions 20 to the open end so that the upper and lower ends of the leader member 5 are guided when they are housed. The insertion-guide portions 21 that are thin are positioned near the case corner portions 4a. Because of this, if the cartridge case 4 falls with the corner portions 4a downward, that is, if a falling shock is exerted directly on the corner portions 4a, the shock wave will propagate from the corner portions 4a to the top and bottom wall surfaces of the opening 10 and therefore the insertion-guide portions 21 with reduced strength will be buckled under pressure and the exterior surface will become bulged, as shown by broken lines. Because of this, the cartridge case 4 has the following problems: it becomes impossible to load it into the drive unit; it becomes impossible for the insertion-guide portions 21 to guide the upper and lower ends of the leader member 5; and the leader member 5 cannot be pulled in and out properly and thus it becomes impossible to use the cartridge case.

In addition, since the leader member 5 is pulled out from the opening 10 by being engaged by a taking-out mechanism provided on the drive side, in the case interior region near the opening 10 it is difficult to dispose a member, for fastening the upper and lower cases 2 and 3 together by small screws, in the vicinity of the corner portion 4a near the opening 4, in order to avoid interference with the taking-out mechanism and assure a running region for magnetic tape 6. For this reason, rigidity near the opening 10 is reduced, so the cartridge case is disadvantageous for enhancing strength to counter the aforementioned falling shock.

The present invention has been made in view of the points mentioned above. Accordingly, it is a first object of the present invention to provide a magnetic tape cartridge that is capable of preventing an insertion-guide portion provided in an opening from being deformed due to shock produced by a fall, etc., to assure reliability.

Magnetic tape cartridges, incidentally, are primarily employed to back up data stored in memory for computers. These magnetic tape cartridges are grouped, for example, into two types. One type is constructed so that when the cartridge is not used, magnetic tape is completely wound on a reel and the leading end portion of the magnetic tape is retained in a leader block which is housed to cover a tape leader opening formed in one corner of a cartridge case. Another type is constructed so that in a tape leader opening formed in one side wall of a cartridge case, a lid openable and closable in a cartridge plane direction is urged toward a closing position by a spring and is retained in the closing position by a lid lock urged to a locking position by the spring so that it is not rotated when the cartridge is not used. The leading end portion of magnetic tape is retained by a hook assembled into the tape leader opening.

If a magnetic tape cartridge with such a construction is set in the recording-reproducing unit of a corresponding external storage unit, the engaging teeth of the reel exposed at the central portion of the lower case is engaged by the rotation means provided on the unit side. Then, in the case of the former, the leader block, as it is, is pulled out together with the magnetic tape by a tape pulling-out mechanism on the unit side, while in the latter the lid is opened by the tape pulling-out mechanism on the unit side and then the hook is pulled but together with the magnetic tape. Next, the magnetic tape is pulled in and to a predetermined position in a tape running path. In this manner, writing or reading of data with respect to the magnetic tape becomes possible.

Of the magnetic tape cartridges of the two kinds mentioned above, the former employing the leader block has the advantage that the tape pulling-out mechanism on the unit side is structurally simple, because the magnetic tape is pulled out only by holding and pulling out the leader block. However, the former has the disadvantage that dust tends to enter the cartridge interior through a gap between the tape leader opening and the leader block when the cartridge is not being used.

On the other hand, the closable lid type of the latter solves the problem of dust tending to enter the cartridge interior, but has the problem that the tape pulling-out mechanism on the unit side becomes complicated and space for the rotary lid is required, because when pulling out the tape, the lid lock is first unlocked and then the lid must be opened. The latter also has the problem that on the cartridge side, the step of assembling a torsion spring for urging the lid and a coil spring for urging the lid lock is required when assembling the cartridge.

Hence, there has been proposed a magnetic tape cartridge in which a slide door is provided for opening and closing the tape leader opening and a spring member for urging this slide door toward a closing position is disposed in a passageway along which the slide moves. In this type of magnetic tape cartridge, a cartridge case is constructed by joining upper and lower cases together. In a side wall of the cartridge case, a tape leader opening is formed between the upper and lower cases and in close proximity to a corner of the cartridge case. A slide door is provided inside the surface of the cartridge case in order to prevent it from being damaged when shock is exerted on the slide door, for example, by dropping of the cartridge case. Therefore, the passageway along which the slide door moves is provided inside the exterior wall on the side of the tape leader opening.

However, since a generally circular interior wall (rib) is provided around a single reel with magnetic tape that is rotatably housed within the cartridge case, an exterior wall 234 on the side of the tape leader opening and the aforementioned interior wall 235 rise from the bottom wall 236 of the lower case 201b, independently of each other, and in opposition to each other across the moving passageway 237 for the slide door, as shown in FIG. 27A which is a sectional view of the lower case 201b. The upper case also has the same construction. For this reason, if the upper and lower cases of the cartridge case are manufactured by injection molding, resin pressure will be less likely to be transmitted to the part of the exterior wall 234. Because of this, there arises a problem that the exterior wall 34 will tilt inside, as shown in FIG. 27B. If the exterior wall 234 tilts inside, the moving passageway 237 for the slide door will be narrowed, and the operation of opening and closing the slide door will be obstructed because a proper gap with the slide door is not formed. In addition, the outside dimensions of the cartridge are reduced. This will cause malfunction within the recording-reproducing unit.

In view of the aforementioned circumstances, a second object of the present invention is to prevent the aforementioned tilt of the exterior wall, in a magnetic tape cartridge provided with a slide door which opens and closes a tape leader opening for pulling out an end of magnetic tape.

This type of magnetic tape cartridge is also equipped with a plastic cartridge case, constructed by joining a generally square flat upper case and a generally square flat lower case at their four corners by a joining means such as small screws.

FIG. 36 is a plan view showing the vicinity of a tape leader opening in the lower case of such a cartridge case.

In FIG. 36, a tape leader opening 326 is formed in the end portion of the side wall 303a of a lower case 303. The top surface of the bottom wall of the lower case 303 has a recess 328 facing the tape leader opening 326. In the recess 328, a leader member (not shown) clamping the leading end of magnetic tape 320 is detachably retained, for example, by a retaining member consisting of a spring plate. Reference character L1 denotes a boundary line, on the maximum tape winding diameter side, of a tape running region; reference character L2 denotes a boundary line, on the minimum tape winding diameter side, of the tape running region. An arcuate rib 332 is erected outside of a reel 304 with magnetic tape 302 wound thereon. In the vicinity of the tape leader opening 326, a boss 334, equipped with a positioning hole (blind hole) 333 which is employed for positioning the magnetic tape cartridge with respect to a recording-reproducing unit when loading the cartridge into the unit, and a boss 336, equipped with a screw inserting hole (through hole) 335 for fastening the upper and lower shells, are erected close to each other.

In a one-reel type magnetic tape cartridge, unlike a two-reel type magnetic tape cartridge, a direction in which the magnetic tape 320 is pulled out is usually in an A-direction or B-direction, shown in the lower right of FIG. 36 (in the two-reel type, a C-direction). Because of this, on the maximum tape winding diameter side of the tape running region, the magnetic tape 320 runs close to the side wall 303b of the cartridge case and therefore there arises a problem that the magnetic tape 320 will tend to be attached to the side wall 303b of the plastic magnetic cartridge case in which static electricity is liable to occur. In addition, during archiving of the magnetic tape 320, it also tends to be attached to the side wall 303b, because it is wound on the reel and archived.

Therefore, there arises an inconvenience that during running, (1) the magnetic tape 320 will make contact with the side wall 303b and will be damaged, (2) data stored on the tape will be destroyed, and (3) recording and reproducing of the data will become impossible. In addition, since the magnetic tape 320 scrapes the wall surface of the side wall 303b, powder develops and causes the tape to be dropped out. Furthermore, there is also a fear that during archiving, a component coated on the magnetic tape will react with the resin component of the cartridge case and the magnetic tape 320 will be attached to the wall surface of the side wall 303b.

Furthermore, since a compact and large-capacity one-reel type magnetic tape cartridge has recently been developed for backing up data, the tape wound body (wound ball) being housed within the cartridge case is close to the interior wall surface of the cartridge case, and the magnetic tape of the large-capacity type is low in rigidity because the thickness is as thin as a few $\mu$m. Because of this, the magnetic tape tends to be affected by static electricity.

In view of such circumstances, it is a third object of the present invention to run magnetic tape stably by preventing the attachment of magnetic tape onto the interior surface of the cartridge case to avoid the occurrence of the disadvantages mentioned above.

DISCLOSURE OF THE INVENTION

To achieve the first object of the present invention described above, there is provided a first magnetic tape cartridge comprising:

a cartridge case in which a single reel with magnetic tape wound thereon is rotatably housed;

a leader member, rigidly attached to a leading end of the magnetic tape, which is pulled in and out of an opening formed in the cartridge case; and an insertion-guide portion for guiding an end portion of the leader member, the insertion-guide portion being formed by making a wall surface of the cartridge case thin and also being provided in the opening;

wherein a cutout is provided on at least one side of the insertion-guide portion at a position of an edge of the opening.

The aforementioned cutout is provided on one side or both sides of the insertion-guide portion at the position of an edge of the opening, preferably adjacent to the insertion-guide portion. Particularly, it is desirable that the cutout be provided between the insertion-guide portion and the case corner portion.

It is desirable that the corner portion of the cutout be formed into a curved shape, because deformation of this portion can be suppressed. It is also preferable that the depth of the cutout from the case end surface not be beyond the position of the door rail for the slide door, because the entry of dust can be prevented. Furthermore, the position of the outer end of the insertion-guide portion may be provided inside the surface of the side wall.

To reduce a shock wave that propagates to the insertion-guide portion, a reinforcement member may be disposed in the insertion-guide member by insert molding, or the corner portion of the cartridge case may be formed from a separate member having elasticity.

According to the first magnetic tape cartridge, when forming the insertion-guide portion in the opening of the cartridge case in order to guide the end portion of the leader member rigidly attached to the leading end of the magnetic tape, a cutout is provided on at least one side of the insertion-guide portion at a position of an edge of the opening. The formation of the cutout interrupts the propagation of a shock wave, which is produced when the cartridge case falls with the case corner portion downward, to the insertion-guide portion, or absorbs the deformation. Therefore, the first magnetic tape cartridge is capable of preventing buckling deformation of the insertion-guide portion which has low wall thickness and has lower strength, and also enhancing loading performance to a drive unit and reliability of the operation of guiding the leader member.

To achieve the first object of the present invention described above, there is provided a second magnetic tape cartridge comprising:

a cartridge case in which a single reel with magnetic tape wound thereon is rotatably housed;

a leader member, rigidly attached to a leading end of the magnetic tape, which is pulled in and out of an opening formed in the cartridge case; and an insertion-guide portion for guiding an end portion of the leader member, the insertion-guide portion being formed by making a wall surface of the cartridge case thin and also being provided in the opening;

wherein a portion, in the direction of height, of the side portion of the insertion-guide portion is formed into a curved surface or inclined surface.

Note that it is preferable that at least the part of one-half or more of the height of the insertion-guide portion be formed into a curved surface or inclined surface.

In addition, it is preferable that the end portion of the leader member be formed into a curved surface or inclined surface in conformity with the curved surface or inclined surface of the insertion-guide portion. To reduce the size of the insertion-guide portion, the end portion of the leader member may be formed so that it becomes smaller in outside diameter than a portion of the leader member to which the magnetic tape is connected. The curved surface or inclined surface of the side portion of the insertion-guide portion may have a large number of ribs.

In a third magnetic tape cartridge of the present invention, upper and lower case side walls in the cartridge case near the insertion-guide portion are rigidly attached with each other.

The rigid attachment of the upper and lower case side walls can be performed by adhesion which employs an adhesive, thermal welding which employs ultrasonic welding, or fixation which employs an engaging member such as an elastic claw.

In a fourth magnetic tape cartridge of the present invention, a reinforcement member such as a metal member is disposed on a bottom portion of a door rail along which a slide door slides to open and close the opening.

It is preferable that the reinforcement member employ a metal member having an end portion curved into an L-shape. The end portion is inserted into the side wall of the cartridge case.

In a fifth magnetic tape cartridge of the present invention, a groove for absorbing shock is formed between the insertion-guide portion and a corner portion of the cartridge case by making the wall thickness of a case wall surface thin. The groove may be a V-shaped groove or a U-shaped groove.

In a sixth magnetic tape cartridge of the present invention, a locking member for locking and retaining the leader member is disposed in a portion other than between the insertion-guide portion and a corner portion of the cartridge case, and the wall thickness of the case wall surface of a portion between the insertion-guide portion and the corner portion is increased.

The locking member can be provided by rigidly attaching a line spring at a position remote from the case corner portion by thermal caulking.

In a seventh magnetic tape cartridge of the present invention, a corner portion of a slide door that slides to open and close the opening is cut out and the wall thickness of a portion of the cartridge case which corresponds to the cutout in the slide door is increased.

According to the present invention described above, when forming the insertion-guide portion in the opening of the cartridge case in order to guide the end portion of the leader member rigidly attached to the leading end of the magnetic tape, (1) the side portion of the insertion-guide portion is formed into a curved surface or inclined surface, (2) the upper and lower case side walls in the cartridge case near the insertion-guide portion are rigidly attached with each other, (3) a reinforcement member is disposed on the bottom portion of a door rail by insert molding, (4) a groove for absorbing shock is formed between the insertion-guide portion and a corner portion of the cartridge case, (5) a locking member for locking and retaining the leader member is disposed in a portion other than between the insertion-guide portion and a corner portion of the cartridge case in order to enhance rigidity near the corner portion, or (6) the corner portion of the slide door is cut out and the wall thickness of a portion of the cartridge case which corresponds to the cutout in the slide door is increased. In this manner, the present invention is capable of preventing buckling deformation of the insertion-guide portion due to a falling shock produced when the cartridge case falls with the case corner portion downward, and also enhancing loading performance to a drive unit and reliability of the operation of guiding the leader member.

In a magnetic tape cartridge for achieving the second object of the present invention described above, a rib is provided for connecting an exterior wall, on the side of the tape leader opening, behind a passageway along which the slide door slides, and an interior wall facing the exterior wall.

In that case, a coil spring member for urging the slide door in a closing direction is disposed between a moving passageway for the slide door and a wall portion behind the moving passageway, with the axis of the spring member toward the sliding direction of the slide door. It is preferable that the rib be provided so that it does not interfere with the spring member.

According to the present invention for achieving the aforementioned second object, a rib is provided for connecting an exterior wall on the side of the tape leader opening and an interior wall facing the exterior wall. The formation of the rib can prevent tilting of the exterior wall when manufacturing the upper and lower halves of the cartridge case by injection molding.

Therefore, a suitable gap can be maintained between the exterior wall and the moving passageway for the slide door, so there is no possibility that the operation of opening and closing the slide door will be obstructed. In addition, there is no possibility that malfunction will occur in a recording-reproducing unit, since a reduction in the outside dimensions of the cartridge due to tilting of the exterior wall can be prevented.

To achieve the third object of the present invention described above, there is provided a magnetic tape cartridge comprising:

a cartridge case in which a single reel with magnetic tape wound thereon is rotatably housed, the cartridge case having a tape leader opening;

wherein irregularities are provided on at least an interior wall surface, near the tape leader opening, of the cartridge case.

The irregularities can be provided, for example, by knurling the aforementioned interior wall surface.

The aforementioned third object can also be achieved by providing ribs or bosses in a region, other than a tape running region, and near the tape leader opening in a region, defined by both a boundary line on a maximum tape winding diameter side of the tape running region and a side wall of the cartridge case near the boundary line.

Furthermore, the aforementioned third object can be achieved by performing an antistatic process on at least a sliding portion, near the tape leader opening, in the cartridge case. The antistatic process can be performed by applying an antistatic agent to the aforementioned sliding part, or forming the sliding part from material containing an antistatic agent.

According to the present invention for achieving the third object, irregularities are provided, for example, by knurling at least an interior wall surface, near the tape leader opening, of the cartridge case. This can prevent the attachment of the magnetic tape onto the interior surface of the cartridge case, because the contact area of the magnetic tape with respect to the interior wall surface is reduced and air is present between the interior wall surface and the magnetic tape.

Therefore, the present invention for achieving the third object can avoid the disadvantages that during running, (1) data stored on the magnetic tape is destroyed, (2) recording and reproducing of the data become impossible, and (3) the magnetic tape is dropped out. In addition, there is no possibility that during archiving of the magnetic tape, the magnetic tape will be attached to the interior wall surface of the cartridge case.

Moreover, ribs or bosses are provided in an interior wall surface, near the tape leader opening, of the cartridge case. These ribs or bosses can also be used as ribs or bosses for supporting the member which retains the leader member. In the case where these ribs or bosses are integrally provided on the side wall of the cartridge case, tilting of the side wall during molding can be prevented. The ribs or bosses can also fulfill the function of preventing the entry of dust, if they are provided near the tape leader opening.

Furthermore, the occurrence of static electricity due to sliding can be prevented by performing an antistatic process on at least a sliding portion, near the tape leader opening, in the cartridge case, for example, the slide door. This can also prevent the attachment of the magnetic tape onto the interior wall surface of the cartridge case.

BRIEF DESCRIPTION OF THE DRAWINGS

FIG. 34 is an enlarged plan view of the essential part of a lower case according to an eleventh embodiment of the present invention;

BEST MODE FOR CARRYING OUT THE INVENTION

Embodiments of the present invention for achieving the aforementioned first object will hereinafter be described in detail with reference to the drawings.

Figure 1:
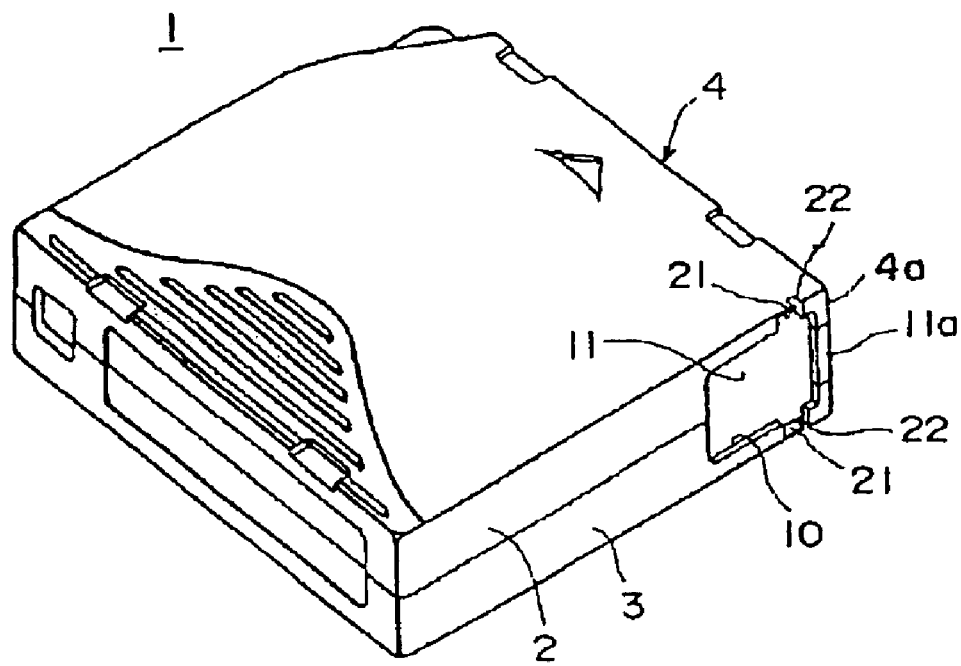
FIG. 1 is a perspective view of a magnetic tape cartridge according to a first embodiment of the present invention.
Figure 2:
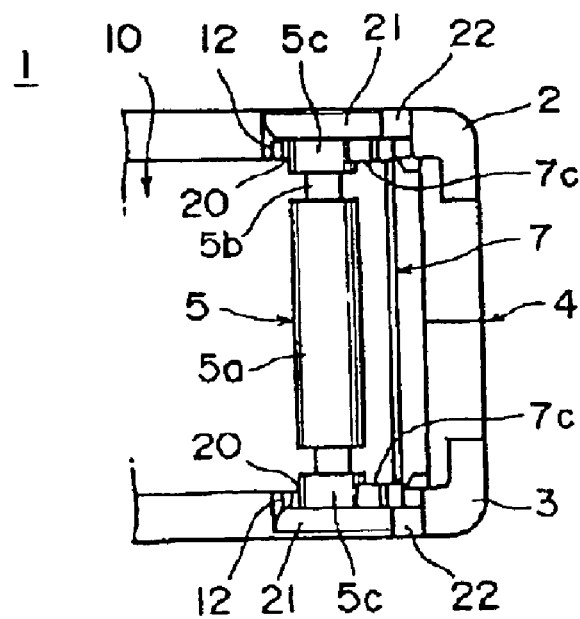
FIG. 2 is a front view of the vicinity of an opening the magnetic tape cartridge case, the slide door of the cartridge case having been opened.
Figures 3, 4:
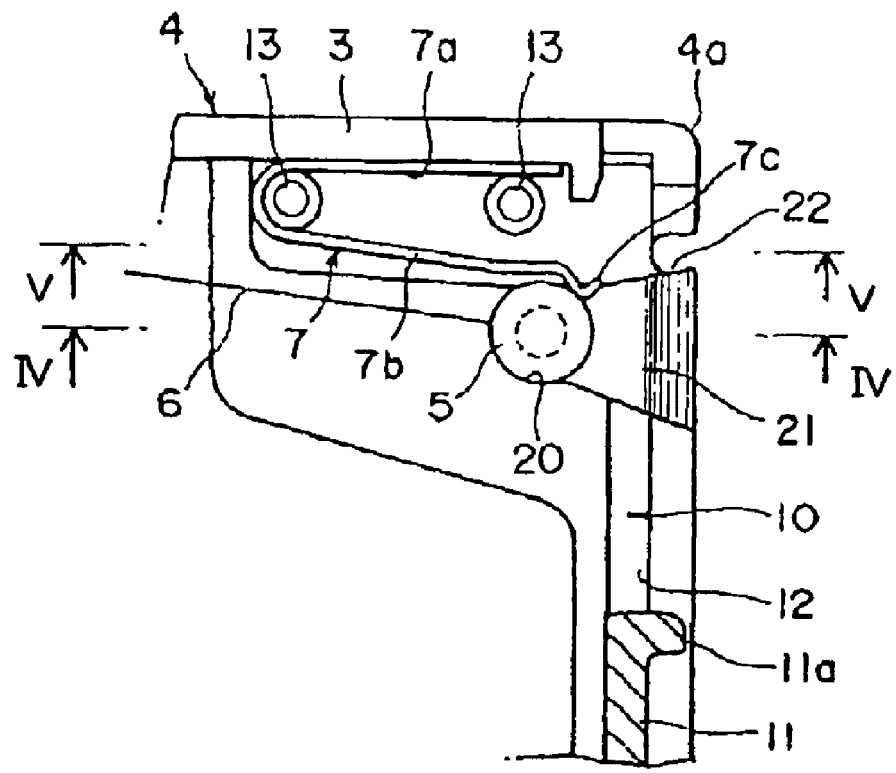
FIG. 3 is a part-sectional plan view of the vicinity of the opening, an upper case having been removed.
FIG. 4 is a sectional view of the cartridge case taken along line IV—IV of FIG. 3.
Figure 5:
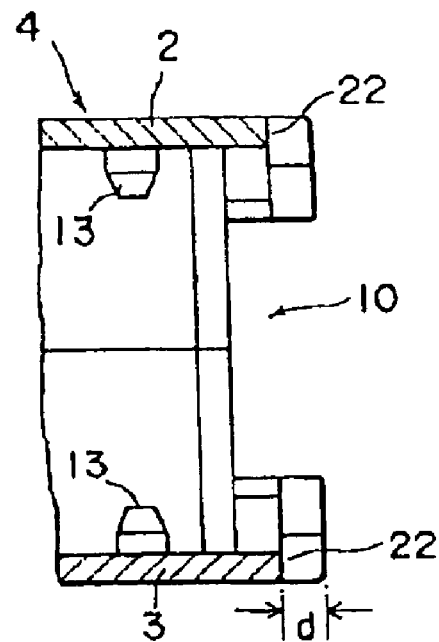
FIG. 5 is a sectional view of the cartridge case taken along line V—V of FIG. 3.
Figure 6:
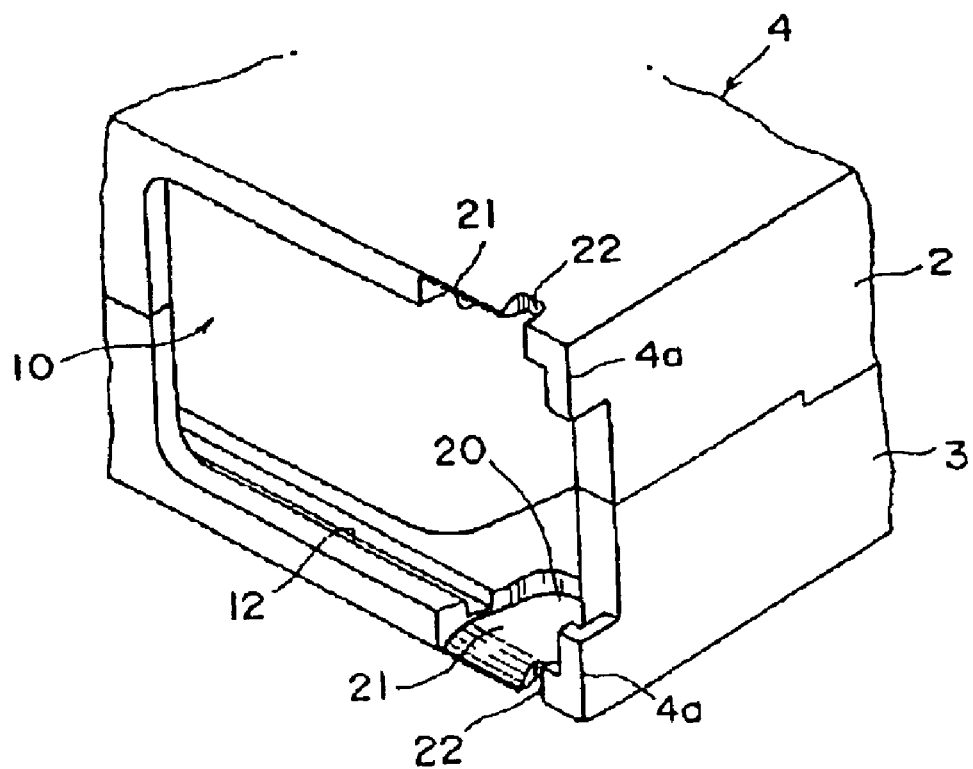
FIG. 6 is a perspective view of the cartridge case of FIG. 2.

FIG. 1 is a perspective view of a magnetic tape cartridge according to a first embodiment of the present invention. FIG. 2 is a front view of the essential part of an opening, a slide door having been opened. FIG. 3 is a plan view of a lower case, an upper case having been removed. FIGS. 4 and 5 are sectional views taken along line IV—IV and line V—V of FIG. 3, respectively. FIG. 6 is a perspective view of the vicinity of the opening, the slide door and internal structure having been omitted.

In the magnetic tape cartridge 1, a single reel (not shown) with magnetic tape 6 (see FIG. 3) rigidly attached at its leading end to a leader pin (leader member) 5 is rotatably housed within a cartridge case 4. The cartridge case 4 is formed by fastening an upper case 2 and a lower case 3 with small screws, etc. A side wall of the cartridge case 4 has an opening 10 for leading out the magnetic tape 6. This opening 10 is opened and closed by a slide door 11 urged in a closing direction.

When the magnetic tape cartridge 1 is not used, the magnetic tape 6 is completely wound on the reel and the leader pin 5 is retained in housing recesses 20 formed near the opening 10. The housing recesses 20 are continuous to guide portions (guide surfaces) 21 formed into a lead-in structure toward the opening 10. The guide portions 21 are formed to guide the upper and lower ends of the leader pin 5 toward the housing recesses 20. Also, the upper and lower cases 2 and 3 inside the opening 10 have door rails 12 (slide grooves), respectively.

A recording-reproducing unit that uses the magnetic tape cartridge 1 holds and pulls in the leader pin 5 to introduce the magnetic tape 6 into a tape running passageway within the unit. A locking member 7 (see FIGS. 2 and 3) such as a spring member is provided for detachably retaining the leader pin 5 in the housing recesses 20. A cutout 22 is also recessed in the case surface and provided in the side portion, on the side of the corner portions 4a, of the insertion-guide portion 21.

As shown in FIG. 2, the leader pin 5 has a central shaft portion 5a to which the leading end of the magnetic tape 6 is rigidly attached; thin shaft portions 5b, formed on both sides of the central shaft portion 5a, which is engaged and held by the recording-reproducing unit; and opposite flanges 5c formed for fixing the cartridge case. The opposite flanges 5c are guided by the insertion-guide portions 21 formed in the interior walls, near the opening 10, of the upper and lower cases 2 and 3 and are inserted and retained in the housing recesses 20, respectively. Furthermore, the opposite flanges 5c are detachably held by the locking member (plate spring) 7 interposed between the upper and lower cases 2 and 3.

The locking member 7 is symmetrical up and down and has a generally U-shaped cross section. The locking member 7 has a plate-shaped mounting portion 7a, which is held by upper and lower mounting bosses 13 erected in the bottom surface of the upper case 2 and the top surface of the lower case 3 along the case wall surface. The locking member 7 also has arm portions 7b extending from the upper and lower ends of a portion curved from the rear end of the mounting portion 7a and also extending toward the opening 10. The front ends of the arm portions 7b are formed into retaining portions 7c, respectively. The retaining portions 7c abut the upper and lower flanges 5c of the leader pin 5. Each retaining portion 7c has an angled portion protruding toward the leader pin 5. The front inclined face of the angled portion is elastically deformed while making contact with the leader pin 5 being inserted through the opening 10, and the rear inclined face retains the leader pin 5 in the housing recess 20 while pressing the pin 5 against the recess 20.

In the opening 10 of the cartridge case 1, the housing recesses 20 are formed into flat surfaces parallel to the interior surfaces of the upper and lower cases 2 and 3, and the vertical gap between the flat surfaces is equal to the length of the leader pin 5. The aforementioned insertion-guide portions 21 are formed from the housing recesses 20 to the open ends so that the vertical gap and the width are widened toward the opening 10. The outer end portion of the insertion-guide portion 21 is constructed with an inclined and curved surface, formed by making the wall surface of the upper case 2 or lower case 3 thin. The aforementioned door rails 12 along which the slide door 11 slides are formed to cross the insertion-guide portions 21, and the inclined surface of each insertion-guide portion 21 extends from the vicinity of the outer edge of the door rail 12 to the open end. Note that the surface of the insertion-guide portion 21 is formed so that it becomes equal to or slightly lower than the bottom surface of the door rail 12.

The outer end of the slide door 11 is provided with a protrusion 11a protruding toward the exterior surface of the cartridge case 1 so that a door opening member on the side of the recording-reproducing unit can engage with the protrusion 11a to perform the operation of opening the slide door 11.

At a position, near the opening 10, on the upper case 2 or lower case 3, the aforementioned cutout 22 is recessed in the case surface and is adjacent to the side portion, on the side of the case corner portion 4a, of the insertion-guide portion 21. The cutouts 22 are formed to penetrate the upper and lower cases 2 and 3. Note that the cutout 22 does not need to be adjacent to the insertion-guide portion 21 if it is situated between the insertion-guide portion 21 and the case corner portion 4a.

The depth d of the cutout 22 from the case surface (see FIG. 5) is at the same position as the outer edge position of the door rail 12 or at a position outside the outer edge position so that in the closed state of the slide door 11, the interior and exterior of the cartridge 1 are not communicated with each other to prevent the entry of dust. It is preferable that the back corners of the cutout 22 be formed into an R-shape to alleviate stress being concentrated on these portions.

Even if the leader pin 5, pulled out of the opening 10 opened by the slide door 11 of the cartridge case 1 of the aforementioned structure, is shifted out of the housing recess 20 when it is housed into the cartridge case 4 as a result of rewinding of the magnetic tape 6, the end face of the flange 5c of the leader pin 5 abuts the insertion-guide portion 21 and is guided while the position is being corrected. The leader pin 5 being guided is pulled into the housing recess 20 and retained by the locking member 7. The slide door 11 shuts the opening 10 and prevents the entry of dust. In addition, even if the magnetic tape cartridge 1 falls during conveyance with the corner portion 4a near the opening 10 downward, the propagation of the shock wave to the thin insertion-guide portion 21 will be interrupted by the formation of the cutout 22 and therefore the buckling deformation of the insertion-guide portion 21 will be prevented.

Figure 7:
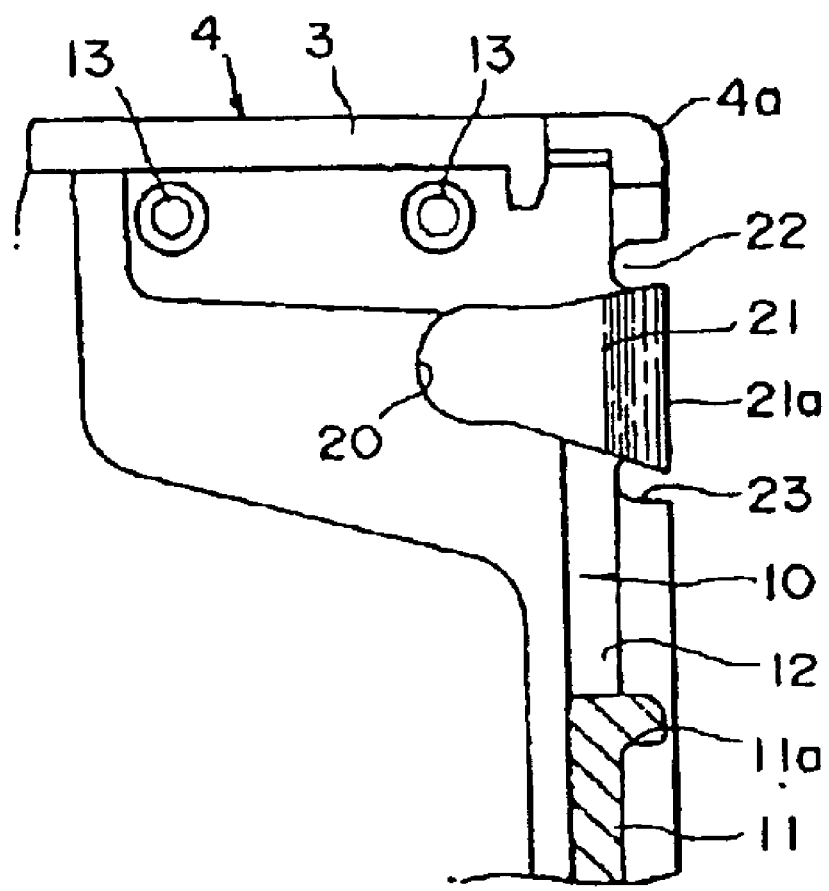
FIG. 7 is a part-sectional plan view of the vicinity of an opening in a modification of the first embodiment.

FIG. 7 shows an alternation of the first embodiment in which cutouts 22 and 23 are formed near both sides of the insertion-guide portion 21. The shape, depth, etc., of the cutout 23 remote from the case corner portion 4a are provided the same way as the aforementioned cutout 22.

It is preferable that the position of the outer end 21a of the insertion-guide portion 21 be at the same position as the case side surface or be provided inside the case side surface, in order to avoid the interference of the outer end 21a with other members. The same applies to the aforementioned example.

The modification of the first embodiment is capable of preventing deformation of the insertion-guide portion 21 more effectively, because the propagation of shock waves to the insertion-guide portion 21 in right and left directions is interrupted by the opposite cutouts 22 and 23.

In the modification, only the cutout 23 remote from the case corner portion 4a may be formed without forming the cutout 22 near to the case corner portion 4a. In that case, when a shock wave is transmitted from the case corner portion 4a, the entire deformation of the insertion-guide portion 21 is absorbed by the cutout 23, so the occurrence of buckling deformation in the insertion-guide portion 21 can be prevented.

The first embodiment and the alternation may further be provided with a construction for suppressing deformation of the insertion-guide portion 21. More specifically, although not shown, a reinforcement member such as a metal plate is disposed in the insertion-guide portion 21 by insert molding, to reinforce the insertion-guide portion 21 and suppress deformation. Alternatively, the corner portion 4a of the cartridge case 4 may be formed from a separate member, which has flexibility, such as urethane resin, etc., to reduce a shock wave itself that propagates to the insertion-guide portion 21. In this case, they are simultaneously molded by dichroic molding, or molded components are joined together. Note that the deformation suppressing structure may be provided in a cartridge case having no cutouts 22 and 23.

Furthermore, the design of the locking member 7 mentioned above may be changed as appropriate. The locking member 7, in addition to the vertically integral type, may be formed from upper and lower separate line springs or plate springs.

Figure 8:
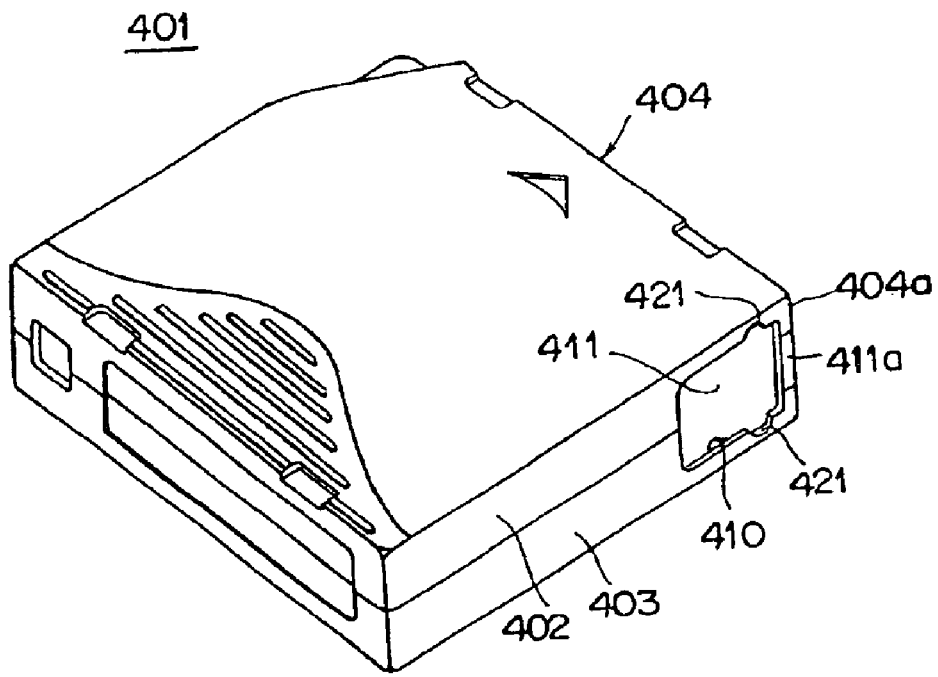
FIG. 8 is a perspective view of a magnetic tape cartridge according to a second embodiment of the present invention.
Figure 9:
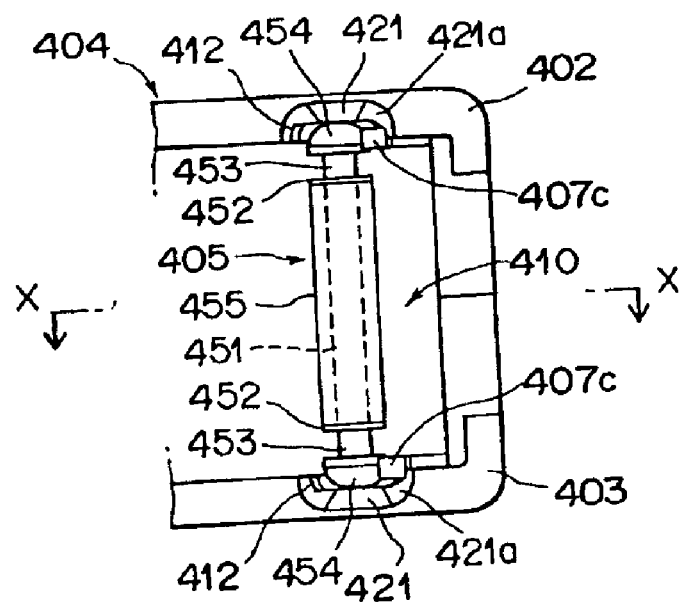
FIG. 9 is a front view of the vicinity of an opening in the magnetic tape cartridge case, the slide door of the cartridge case having been opened.
Figure 10:
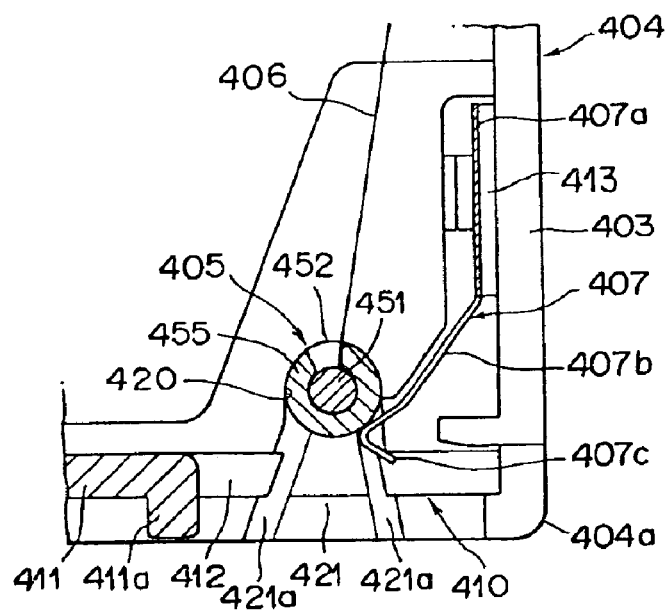
FIG. 10 is a sectional plan view of the vicinity of the opening taken along line X—X of FIG. 9.
Figure 11A:
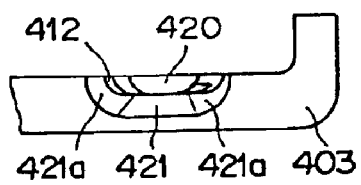
FIG. 11A is a front view of an insertion-guide portion in the second embodiment.
Figure 11B:
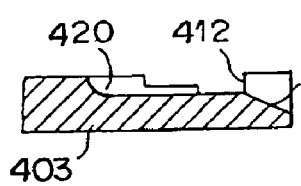
FIG. 11B is a sectional side view of the insertion-guide portion in the second embodiment.
Figure 11C:
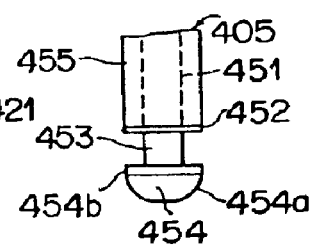
FIG. 11C is a front view of the essential part of a leader member in the second embodiment.

FIG. 8 is a perspective view of a magnetic tape cartridge according to a second embodiment of the present invention. FIG. 9 is a front view of the vicinity of an opening in the magnetic tape cartridge case, the slide door of the cartridge case having been opened. FIG. 10 is a sectional plan view of the vicinity of the opening taken along line X—X of FIG. 9, FIG. 11A is a front view of the insertion-guide portion of the magnetic tape cartridge of FIG. 8, FIG. 11B is a sectional side view of the insertion-guide portion, and FIG. 11C is a front view of the essential part of the leader member in FIG. 8.

In the magnetic tape cartridge 401, a single reel (not shown) with magnetic tape 406 (see FIG. 10) rigidly attached at its leading end to a leader pin (leader member) 405 is rotatably housed within a cartridge case 404. The cartridge case 404 is formed by fastening an upper case 402 and a lower case 403 with small screws, etc. A side wall of the cartridge case 404 has an opening 410 for leading out the magnetic tape 406. This opening 410 is opened and closed by a slide door 411 urged in a closing direction.

When the magnetic tape cartridge 401 is not used, the magnetic tape 406 is completely wound on the reel and the leader pin 405 is retained in housing recesses 420 formed near the opening 410. The housing recesses 420 are continuous to guide portions (guide surfaces) 421 formed into a lead-in structure toward the opening 410. The guide portions 421 are formed to guide the upper and lower ends of the leader pin 405 toward the housing recesses 420. Also, the upper and lower cases 402 and 403 inside the opening 410 have door rails 412 (slide grooves), respectively.

A recording-reproducing unit that uses the magnetic tape cartridge 401 holds and pulls in the leader pin 405 to introduce the magnetic tape 406 into a tape running passageway within the unit. A locking member 407 (see FIG. 10) such as a spring member is provided for detachably retaining the leader pin 405 in the housing recesses 420. Also, the opposite side portions of the insertion-guide portion 421 and the opposite end portions of the leader pin 405 are partially formed into curved surfaces (R-shapes).

As shown in FIG. 9, the leader pin 405 has (1) a central shaft clamp portion 405a which clamps the leading end of the magnetic tape 406 by the fit of a C-cross-section clamp member 455 onto the portion 405a; (2) upper and lower flange portions 452 formed on both sides of the shaft clamp portion 451; (3) thin engaging portions 453, formed outside the flange portions 452, which are engaged and held by the recording-reproducing unit; and (4) opposite fixing portions 454 for fixing the cartridge case. The clamp member 455 is a resin molded component and is elastically fitted on the shaft clamp portion 451 with the magnetic tape 406 interposed between them. In this manner, the leader pin 405 and the magnetic tape 406 are coupled together.

The opposite fixing portions 454 of the leader pin 405 are guided by the insertion-guide portions 421 formed in the interior walls, near the opening 410, of the upper and lower cases 402 and 403 and are inserted and retained in the housing recesses 420, respectively. Furthermore, the opposite fixing portions 454 are detachably held by a locking member (plate spring) 407 interposed between the upper and lower cases 402 and 403.

The locking member 407 is integral up and down and has a plate-shaped mounting portion 407a, which is held by a spring holding member 413 (see FIG. 10) provided along the case wall surface. The locking member 407 also has arm portions 407b extending from the front upper and lower end portions of the mounting portion 407a toward the opening 410. The front ends of the arm portions 407b are formed into retaining portions 407c, respectively. The retaining portions 407c abut the upper and lower fixing portions 454 of the leader pin 405. Each retaining portion 407c has an angled portion protruding toward the leader pin 405. The front inclined face of the angled portion is elastically deformed while making contact with the leader pin 405 being inserted through the opening 410, and the rear inclined face retains the leader pin 405 in the housing recess 20 while pressing the pin 405 against the recess 420.

In the opening 410 of the cartridge case 401, the vertical gap between the housing recesses 420 is equal to the length of the leader pin 405. The aforementioned insertion-guide portions 421 are formed from the housing recesses 420 to the open end so that the vertical gap and the width are widened toward the opening 410. The outer end portion of the insertion-guide portion 421 is constructed with an inclined and curved surface, formed by making the wall surface of the upper case 402 or lower cases 403 thin. The aforementioned door rails 412 along which the slide door 411 slides are formed to cross the insertion-guide portions 421, and the inclined surface of each insertion-guide portion 421 extends from the vicinity of the outer edge of the door rail 412 to the open end. Note that the surface of the insertion-guide portion 421 is formed so that it becomes equal to or slightly lower than the bottom surface of the door rail 412.

The outer end of the slide door 411 is provided with a protrusion 411a protruding toward the exterior surface of the cartridge case 401 so that a door opening member on the side of the recording-reproducing unit can engage with the protrusion 411a to perform the operation of opening the slide door 411.

As also shown in FIG. 11A, a portion of each side of the insertion-guide portion 421 of the opening 410 in the upper case 402 or lower cases 403, preferably the part of one-half or more of the height, is formed into a curved surface 421a (R-shape), and both side portions of the insertion-guide portion 421 at the open end are thickened by the amount of the curved surface 421. In this manner, rigidity is enhanced and stress concentration is alleviated.

As shown in FIG. 11C, the tip end of the fixing portion 454 of the leader pin 405 is also formed into a curved surface 454a (R-shape) in conformity to the curved surface 421a of the insertion-guide portion 421. This curved surface 454a is formed so that a cylindrical surface 454b is left behind in the vicinity of the engaging portion 453 of the fixing portion 454 and a flat surface is left behind at the central portion of the tip end face. Furthermore, as shown in FIG. 11B, the circumferential edge portion of the housing recess 420 is also formed into a curved surface in conformity with the curved surface 454a of the leader pin 405.

Figure 12A:
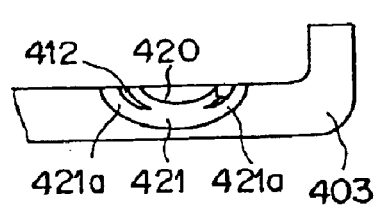
FIG. 12A is a front view of a first modification of the insertion-guide portion in the second embodiment.
Figure 12B:
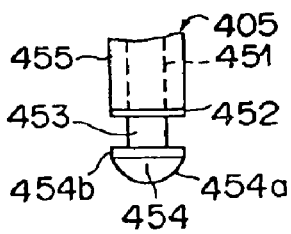
FIG. 12B is a front view of the essential part of the first modification of the leader member in the second embodiment.

FIG. 12A is a front view of a first modification of the insertion-guide portion in the second embodiment, and FIG. 12B is a front view of the essential part of the first modification of the leader member in the second embodiment. The entire insertion-guide portion 421 of the opening 410 in the upper and lower cases 402 and 403 is formed into a curved surface 421a, as shown in FIG. 12A. The entire tip end of the fixing portion 454 of the leader pin 405, in conformity with the curved surface 421a of the insertion-guide portion 421, is formed into a curved surface 454a (R-shape), leaving behind a cylindrical surface 454b on the side of the engaging portion 453, as shown in FIG. 12B. Furthermore, the bottom surface portion of the housing recess 420 is also formed into a curved surface in conformity with the curved surface 454a of the leader pin 405.

Figure 13A:
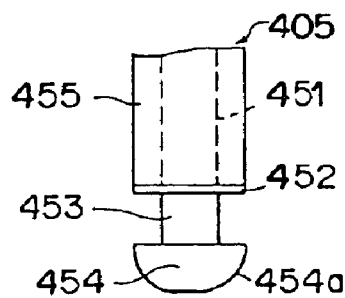
FIGS. 13A and 13B are front views of the essential parts of second and third modifications of the leader member in the second embodiment.
Figure 13B:
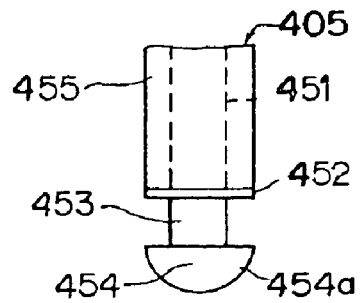

FIGS. 13A and 13B are front views of the essential parts of second and third modifications of the leader member in the second embodiment. In these modifications, the curved surface 454a of the fixing portion 454 extends to the part of the engaging portion 453 without providing the cylindrical surface 454b. In FIG. 13A, the curved surface 454a is formed, leaving behind a flat surface at the tip end. In FIG. 13B, the entire tip end is formed into the curved surface 454a. The remaining construction is provided in the same way as the aforementioned.

Figure 14A:
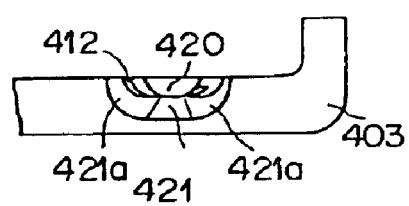
FIG. 14A is a front view of the second modification of the insertion-guide portion in the second embodiment.
Figure 14B:
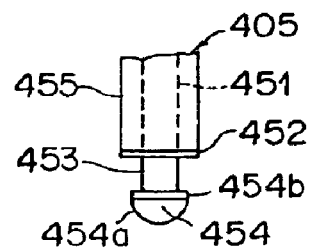
FIG. 14B is a front view of the essential part of a fourth modification of the leader member in the second embodiment.

FIG. 14A is a front view of the second modification of the insertion-guide portion in the second embodiment, and FIG. 14B is a front view of the essential part of a fourth modification of the leader member in the second embodiment.

The open width of the insertion-guide portion of the opening 410 in the upper and lower cases 402 and 403 is narrowed so that the rigidity of the insertion-guide portion 421 at the open end is enhanced.

Both side portions of the insertion-guide portion 421, as with the aforementioned case, are formed into curved surfaces 421a (R-shapes). Because of this, as shown in FIG. 14B, the outside diameter of the fixing portion 454 of the leader pin 405 is smaller than those of the flange portion 52 and the clamp member 455 (in the tape connected portion), and the entire tip end of the fixing portion 454 is formed into a curved surface 454a, leaving behind a cylindrical surface 454b on the side of the engaging portion 453. Furthermore, the size of the housing recess 420 is also reduced and the bottom surface portion is formed into a curved surface.

Figure 15A:
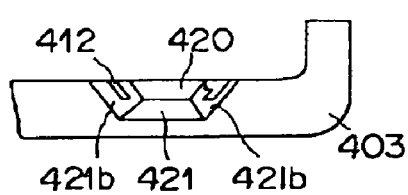
FIG. 15A is a front view of the third modification of the insertion-guide portion in the second embodiment.
Figure 15B:
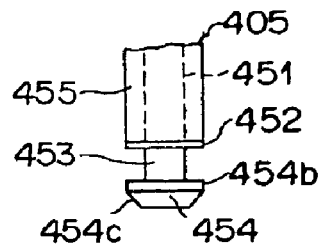
FIG. 15B is a front view of the essential part of a fifth modification of the leader member in the second embodiment.

FIG. 15A is a front view of the third modification of the insertion-guide portion in the second embodiment, and FIG. 15B is a front view of the essential part of a fifth modification of the leader member in the second embodiment.

Both side portions of the insertion-guide portion 421 of the opening 410 in the upper and lower cases 402 and 403 are formed into inclined surfaces 421b. Also, as shown in FIG. 15B, the corner portions of the tip end of the fixing portion 454 of the leader pin 405, in conformity with the inclined surfaces 421b of the insertion-guide portion 421, are formed into inclined surfaces 454c, leaving behind a cylindrical surface 454b on the side of the engaging portion 453. Furthermore, the circumferential edge portion of the housing recess 420 is also formed into an inclined surface in conformity with the inclined surface 454b of the leader pin 405.

Note that the curved surface 421a and inclined surface 421b of the insertion-guide portion 421 maybe formed by disposing a large number of ribs, which each have the aforementioned curved surface or inclined surface at the tip end face, on both side portions of the insertion-guide portion 421, although not shown.

In the cartridge case 401 of the second embodiment, even if the leader pin 405, pulled out of the opening 410 opened by the slide door 411 of the cartridge case 401 of the aforementioned structure, is shifted out of the housing recess 420 when it is housed into the cartridge case 404 according to rewinding of the magnetic tape 406, the end face of the fixing portion 454 of the leader pin 405 abuts the insertion-guide portion 421 and is guided while the position is being corrected. The leader pin 405 being guided is pulled into the housing recess 420 and retained by the locking member 407. The slide door 411 shuts the opening 410 and prevents the entry of dust. In addition, even if the magnetic tape cartridge 401 falls during conveyance with the corner portion 404a near the opening 410 downward, the buckling deformation of the insertion-guide portion 421 can be prevented, because both side portions of the insertion-guide portion 421 are formed into curved surface or inclined surfaces so that rigidity is enhanced.

Figure 16:
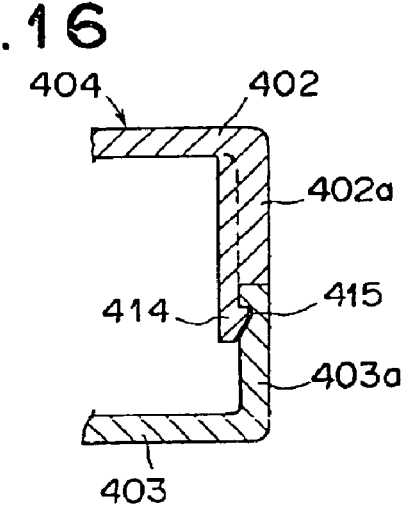
FIG. 16 is a sectional view of the essential part of the cartridge case of a magnetic tape cartridge according to a third embodiment.

FIG. 16 is a sectional view of the essential part of the cartridge case of a magnetic tape cartridge according to a third embodiment.

The fundamental structure in this embodiment, such as upper and lower cases 402 and 403, a leader pin 405, etc., is the same as the structure shown in the aforementioned second embodiment, and the side walls of the upper and lower cases 402 and 403 of a cartridge case 404 near an opening 410 are rigidly attached with each other to enhance rigidity.

That is, an insertion-guide portion 421 is formed in the opening 410 of the cartridge case 404. At the contact portion between the side walls 402a and 403a of the upper and lower cases 402 and 403 near the insertion-guide portion 421, the interior surface of the side wall 402a of the upper case 402 is provided with an elastic claw 414 (engaging member) protruding downward from the contact portion, while the interior surface of the side wall 403a of the lower case 403 is provided with an engaging recess 415. When the upper and lower cases 402 and 403 are assembled together, the elastic claw 414 engages with the engaging recess 415. As a result, the upper case 402 and the lower case 403 are rigidly attached near the opening 410.

In an alternation of the third embodiment, which does not employ the aforementioned elastic claw 414, the contact portion between the side walls 402a and 403a of the upper and lower cases 402 and 403 near the insertion-guide portion 421 may be rigidly attached by adhesion which employs an adhesive, or thermal welding which employs ultrasonic welding, in order to enhance rigidity.

According to the third embodiment, in the vicinity of the opening 410 of the cartridge case 404, particularly in the vicinity of the insertion-guide portion 421, and at a position remote from a portion where the upper and lower cases 402 and 403 are fastened together by small screws, the side walls 402a and 403a of the upper and lower cases 402 and 403 are rigidly attached by adhesion, welding, engagement, etc. This enhances the rigidity of the vicinity of the insertion-guide portion 421 and enhances the strength with regard to dropping. Thus, the buckling deformation of the insertion-guide portion 421 can be prevented.

Figure 17:
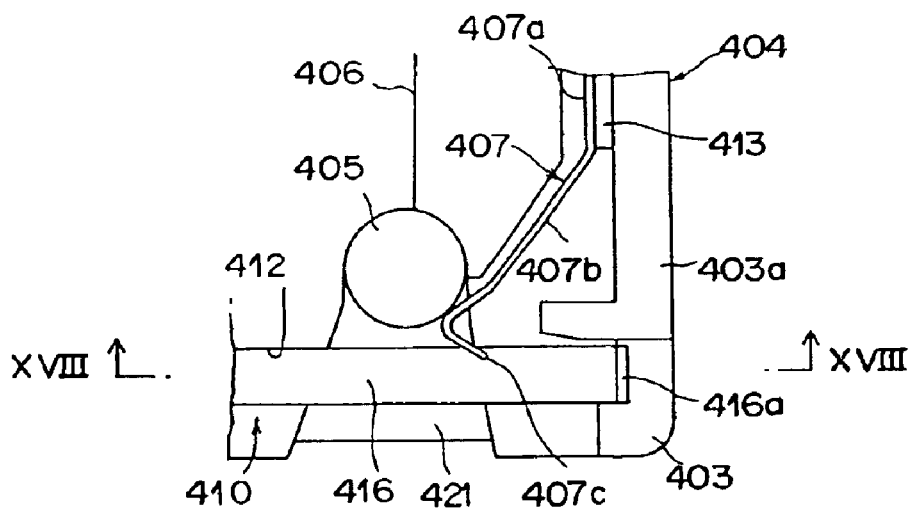
FIG. 17 is a plan view of the essential part of a magnetic tape cartridge according to a fourth embodiment of the present invention, the upper case having been removed.
Figure 18:
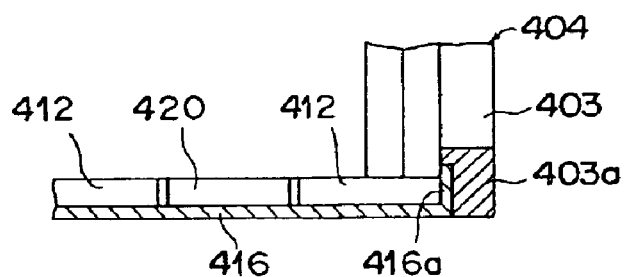
FIG. 18 is a sectional front view taken along line XVIII—XVIII in FIG. 17.

FIG. 17 is a plan view of the essential part of a magnetic tape cartridge according to a fourth embodiment of the present invention, the upper case having been removed. FIG. 18 is a sectional front view taken along line XVIII—XVIII in FIG. 17.

The fundamental structure in this embodiment, such as upper and lower cases 402 and 403, a leader pin 405, etc., is the same as the aforementioned second embodiment, and the side walls of the upper and lower cases 402 and 403 of a cartridge case 404 near an opening 410 are rigidly attached with each other to enhance rigidity.

That is, in the bottom of the door rail 412 along which a slide door 411 slides to open and close the opening 410, a metal member 416 (reinforcement member) is disposed by insert molding when molding the upper and lower cases 402 and 403, in order to reinforce the vicinity of an insertion-guide portion 421.

The metal member 416 is formed from a metal plate such as stainless steel and has an end portion 416a bent into an L-shape. The end portion 416a is inserted into the side wall 403a of the cartridge case 404.

According to the fourth embodiment, the part of the door rail 412 of the opening 410 of the cartridge case 404 is reinforced with the metal member 416 by insert molding. This reinforcement enhances the rigidity of the vicinity of the insertion-guide portion 421 and enhances the strength with regard to dropping. Thus, the buckling deformation of the insertion-guide portion 421 can be prevented.

Figure 19:
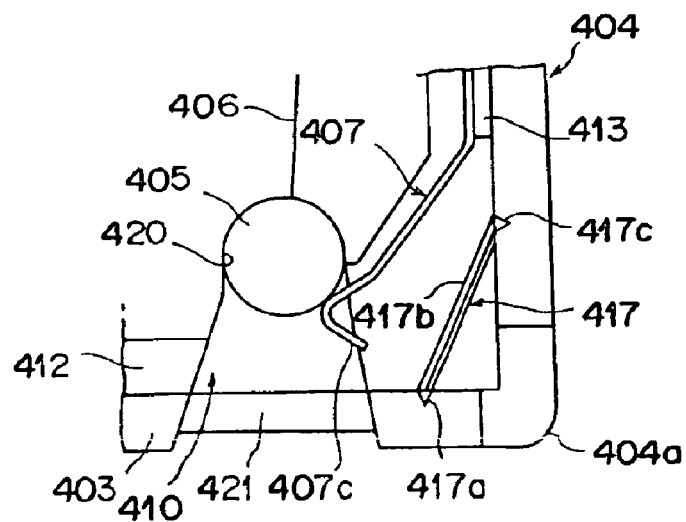
FIG. 19 is a plan view of the essential part of a magnetic tape cartridge according to a fifth embodiment of the present invention, the upper case having been removed.

FIG. 19 is a plan view of the essential part of a magnetic tape cartridge according to a fifth embodiment of the present invention, the upper case having been removed.

The fundamental structure in this embodiment, such as upper and lower cases 402 and 403, a leader pin 405, etc., is the same as the structure shown in the aforementioned second embodiment, and between (1) an insertion-guide portion 421 and a housing portion 420 and (2) the corner portion 404a of a cartridge case 404, the wall thickness of the case wall surface is reduced to form a groove 417 that absorbs shock.

That is, the groove 417 is constructed of a vertical groove 417a formed vertically in the interior surface of the wall between the insertion-guide portion 421 and corner portion 404a of the lower case 403 (the same applies to the upper case 402); an oblique groove 417b formed obliquely in the top surface of the bottom wall; and a vertical groove 417c formed vertically in the interior surface of the side wall perpendicular to the opening 410. The grooves 417a to 417c are recessed into the form of a V-shape, and the wall thickness of the case wall surfaces of these portions is reduced to absorb shock transmitted from the corner portion 404a and prevent the buckling deformation of the insertion-guide portion 421. In the case of an excessive falling shock, either deformation of the groove 417 or occurrence of cracks absorbs shock and prevents destruction of the insertion-guide portion 421.

Note that the sectional configuration of the groove 417 may be a U-shape instead of a V-shape. The depth, width, etc., are designed according to the form of the insertion-guide portion 421, the material of the cartridge case 404, etc.

Figure 20:
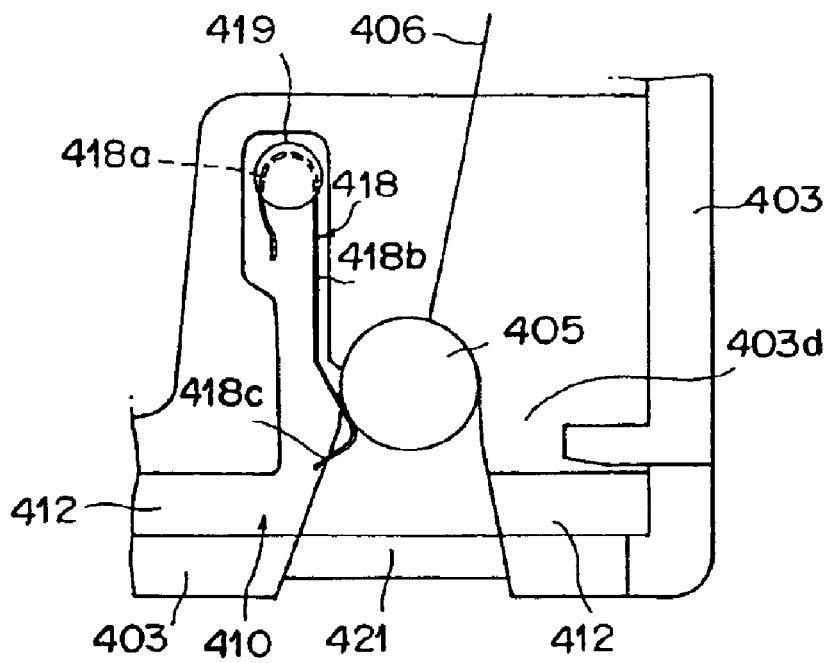
FIG. 20 is a plan view of the essential part of a magnetic tape cartridge according to a sixth embodiment of the present invention, the upper case having been removed.

FIG. 20 is a plan view of the essential part of a magnetic tape cartridge according to a sixth embodiment of the present invention, the upper case having been removed.

The fundamental structure in this embodiment, such as upper and lower cases 402 and 403, a leader pin 405, etc., is the same as the structure shown in the aforementioned second embodiment, and the rigidity of a cartridge case 404 near the corner portion 404a of an opening 410 is enhanced.

That is, a locking member 418 for engaging and retaining the leader pin 405 is disposed in a portion other than between the insertion-guide portion 421 and corner portion 404a of the lower case 403 (the same applies to the upper case 402), for example, on a side remote from the corner portion 404a, as in the illustrated example. Also, the wall thickness of a bottom wall portion 403d between the insertion-guide portion 421 and the corner portion 404a of the cartridge case 404 is increased to enhance the rigidity.

The locking member 418 is formed into upper and lower separate bodies with line springs. Each locking member 418 has a curved mounting portion 418a rigidly attached to the lower case 403 with thermal caulking by melting a mounting boss 419. The locking member 418 also has an arm portion 418b extending from the mounting portion 418a to the opening 410. The outer end portion of the arm portion 418b is formed into an angled retaining portion 418c. The retaining portion 418c abuts the fixing portion 454 of the leader pin 454 and presses and retains the leader pin 405 within the housing recess 420.

According to the sixth embodiment, the case wall surface, near the corner portion 404a and the insertion-guide portion 421, is thickened by changing the location of the locking member 418. This enhances the rigidity and enhances the strength with regard to being dropped. Thus, the buckling deformation of the insertion-guide portion 421 can be prevented.

Figure 21:
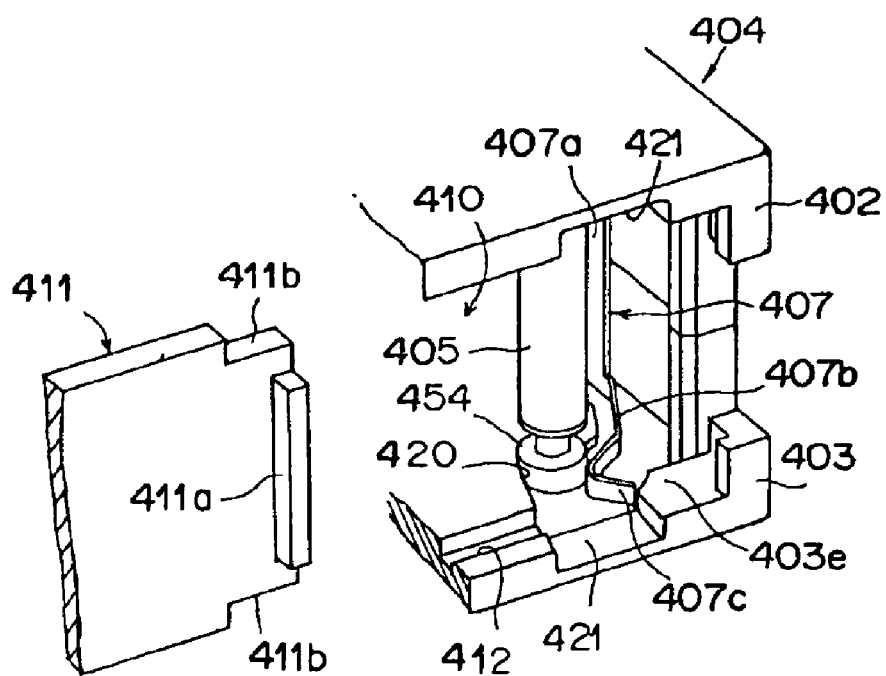
FIG. 21 is a perspective view of the essential part of a magnetic tape cartridge according to a seventh embodiment of the present invention.

FIG. 21 is a perspective view of the essential part of a magnetic tape cartridge according to a seventh embodiment of the present invention.

The fundamental structure in this embodiment, such as upper and lower cases 402 and 403, a leader pin 405, etc., is the same as the structure shown in the aforementioned first embodiment, and the rigidity of a cartridge case 404 near the corner portion 404a of an opening 410 is enhanced.

That is, cutouts 411b are formed in the outer upper and lower end portions of a slide door 411 which slides for opening and closing the opening 410. On the other hand, a door rail 412 in the form of a recess is not formed on the side of the corner portion 404a of the insertion-guide portion 421 in the lower case 403 (the same applies to the upper case 402). That is, the wall thickness of a sliding portion 403e near the corner portion 404a is thickened to enhance the rigidity.

According to the seventh embodiment, the wall thickness of sliding portion 403e near the corner portion 404a is thickened by changing the configuration of the slide door 411 and door rail 412. This enhances the rigidity and enhances the strength with regard to being dropped. Thus, the buckling deformation of the insertion-guide portion 421 can be prevented.

Note that the rigidity-enhancing structures in the aforementioned embodiments may be provided in combination.

Embodiments of the present invention for achieving the aforementioned second object will hereinafter be described in detail with reference to the drawings.

Figure 22:
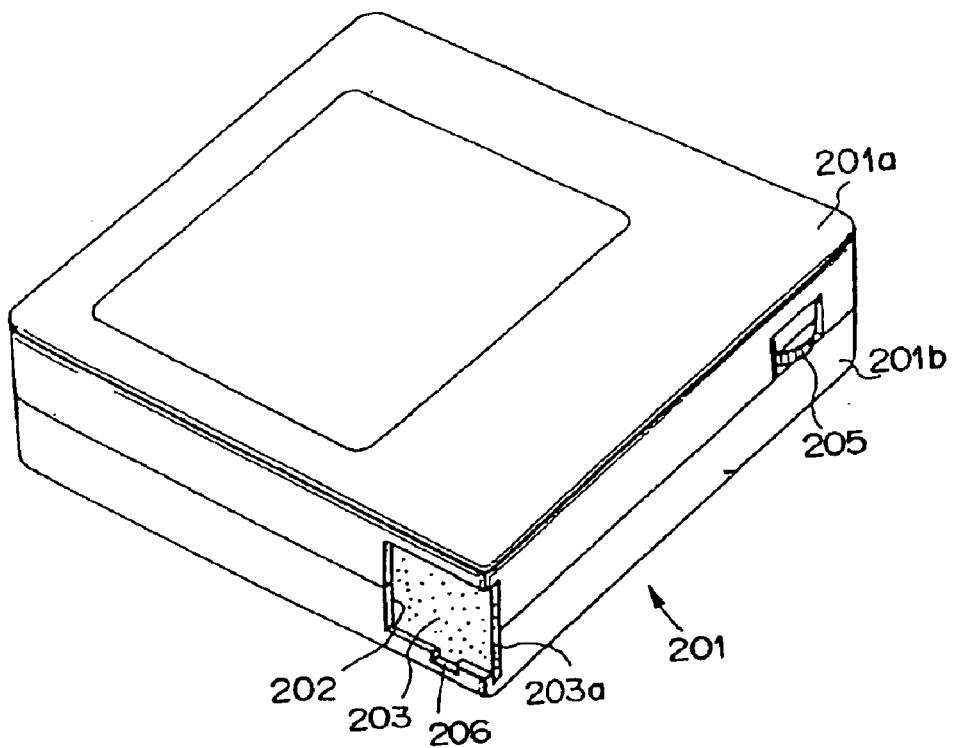
FIG. 22 is a perspective view of a magnetic tape cartridge according to an eighth embodiment of the present invention, a slide door having been closed.
Figure 23:
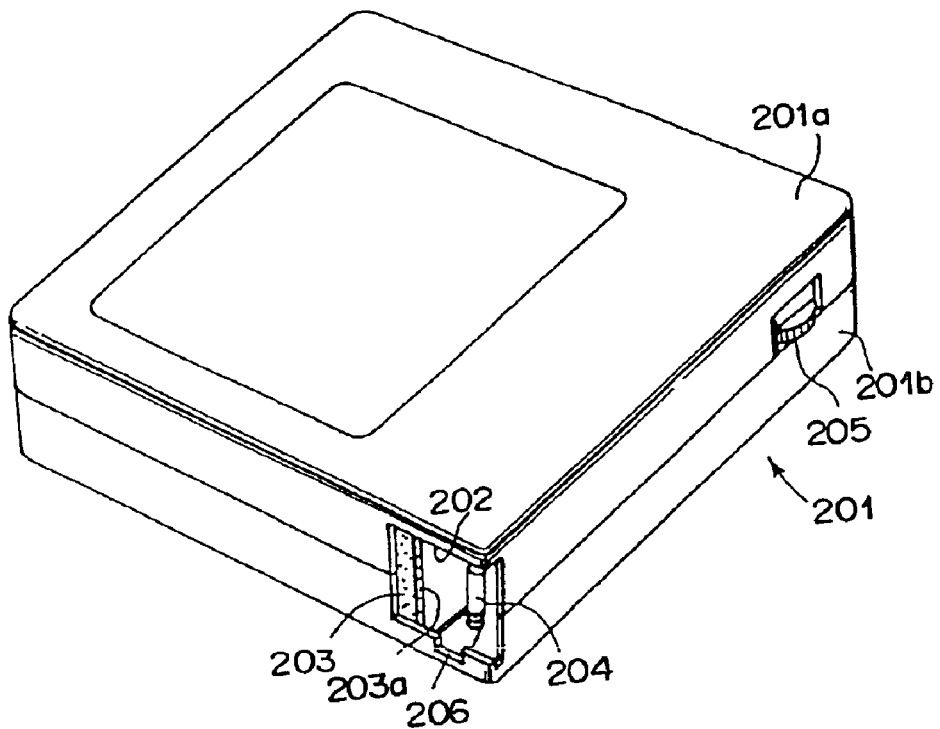
FIG. 23 is a perspective view of the magnetic tape cartridge of FIG. 22, the slide door having been opened.

FIGS. 22 and 23 show perspective views of a magnetic tape cartridge constructed according to the present invention and show the closed state and open state of a slide door, respectively.

In the magnetic tape cartridge, a single reel with magnetic tape wound there on is rotatably housed within a cartridge case 201, which consists of an upper case 201a and a lower case 201b. In a side wall of the cartridge case 201, a tape leader opening 202 for pulling out the leading end of the magnetic tape is formed between the upper case 201a and the lower case 210b and near the corner portion of the cartridge case 201. Also, a slide door 203 for opening and closing the tape leader opening 202 is provided so that it is slidable in a direction parallel to a direction in which an external unit for the magnetic tape cartridge is inserted.

The slide door 203, as described later, is urged, in the interior of the cartridge case 201, toward a closing position by a spring member 220 (see FIGS. 25 and 26) interposed between the cartridge case 201 and the slide door 203 and is held in the closing position.

Inside the tape leader opening 202, a recess 206 is formed as shown in FIG. 23, and within the recess 206, a leader pin 204 clamping the leading end portion of the magnetic tape is housed. If the magnetic tape cartridge is inserted into a recording-reproducing unit such as an external storage unit, rotation means on the unit side engages with the engaging teeth (not shown) of the reel exposed to an opening in the central portion of the lower case 201b. Also, a member on the unit side abuts the front end face 203a of the slide door 203 and opens the slide door 203. Furthermore, the leader pin 204, along with the magnetic tape, is pulled into the unit by a tape pulling-out mechanism provided on the unit side, and the Magnetic tape is set on the unit side. In this manner, data can be written to or read from the magnetic tape.

In addition, a rotatable control button 205 is exposed through an opening in one side wall of the cartridge case 201 to prevent erasing of data stored on the magnetic tape and double writing of data.

Figure 24:
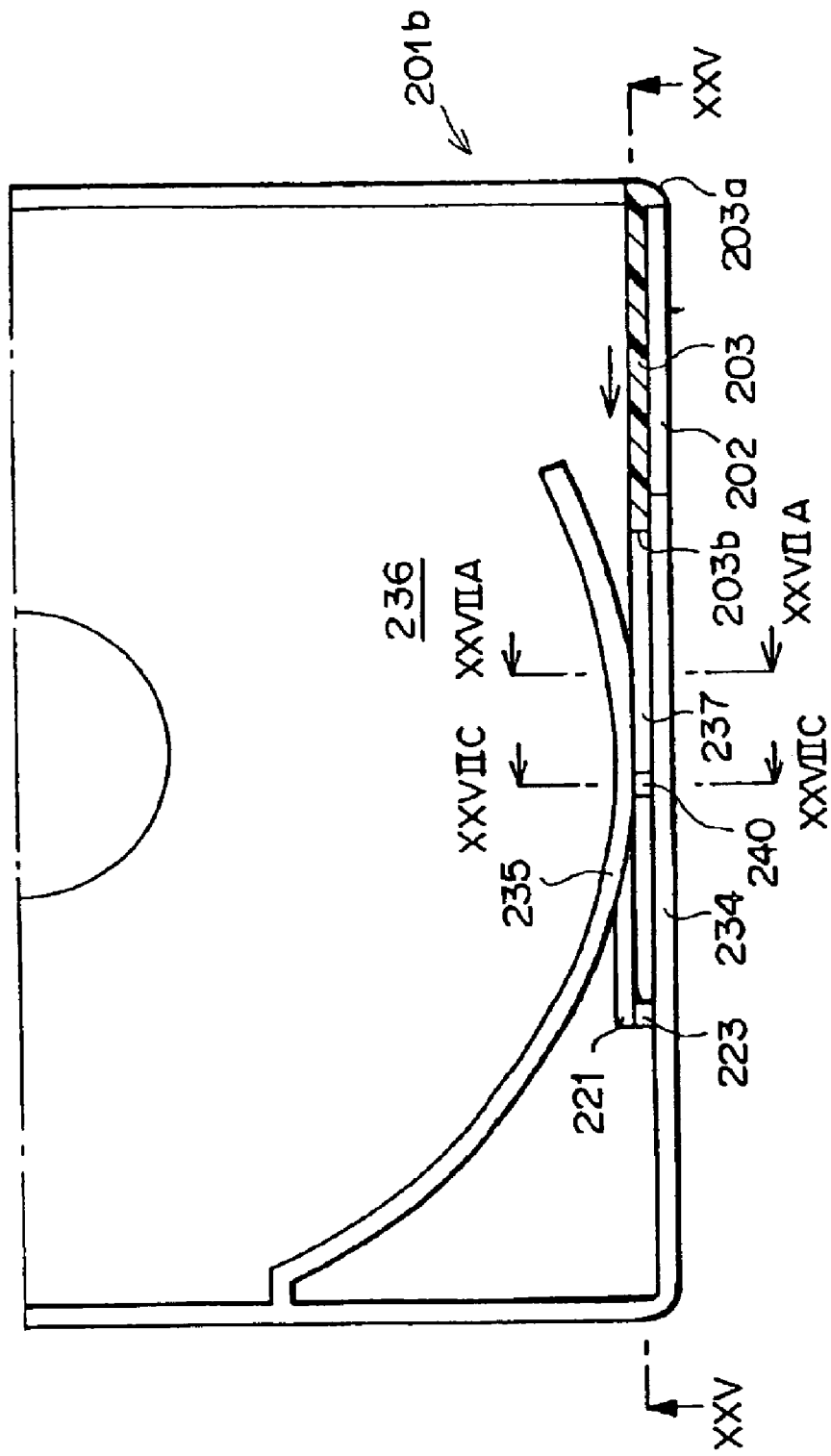
FIG. 24 is a diagrammatic plan view of the essential part of the lower case in the magnetic tape cartridge of FIG. 22.
Figure 25:
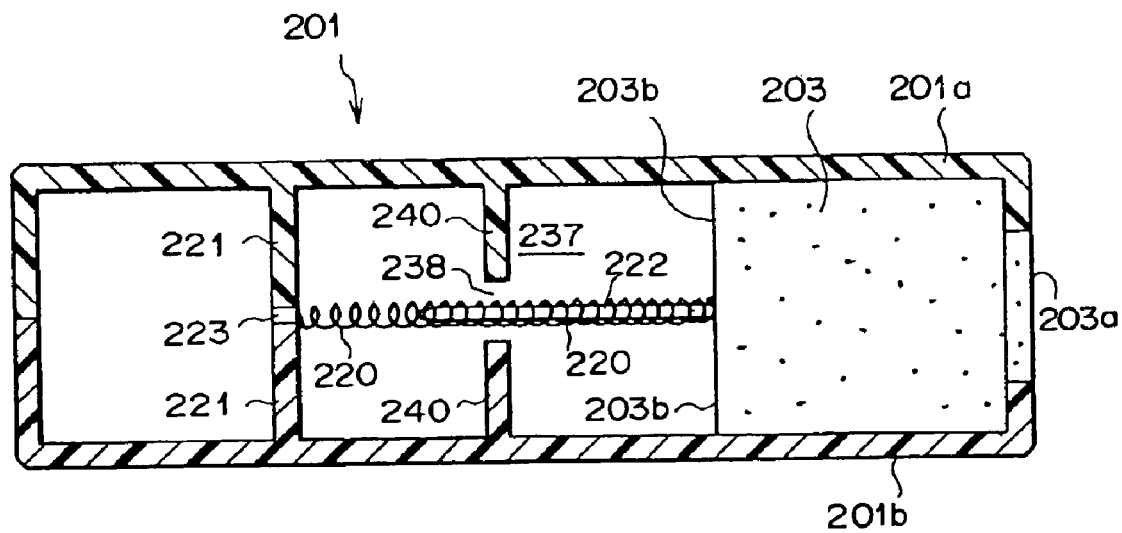
FIG. 25 is a diagrammatic sectional view of the closed state of the slide door taken along line XXV—XXV of FIG. 24.

FIG. 24 is a diagrammatic plan view of the essential part of the lower case of the magnetic tape cartridge of FIG. 22. FIG. 25 is a diagrammatic sectional view of the closed state of the slide door taken along line XXV—XXV of FIG. 24, and FIG. 26 is a diagrammatic sectional view of the open state of the slide door taken along line XXV—XXV of FIG. 24.

Figure 26:
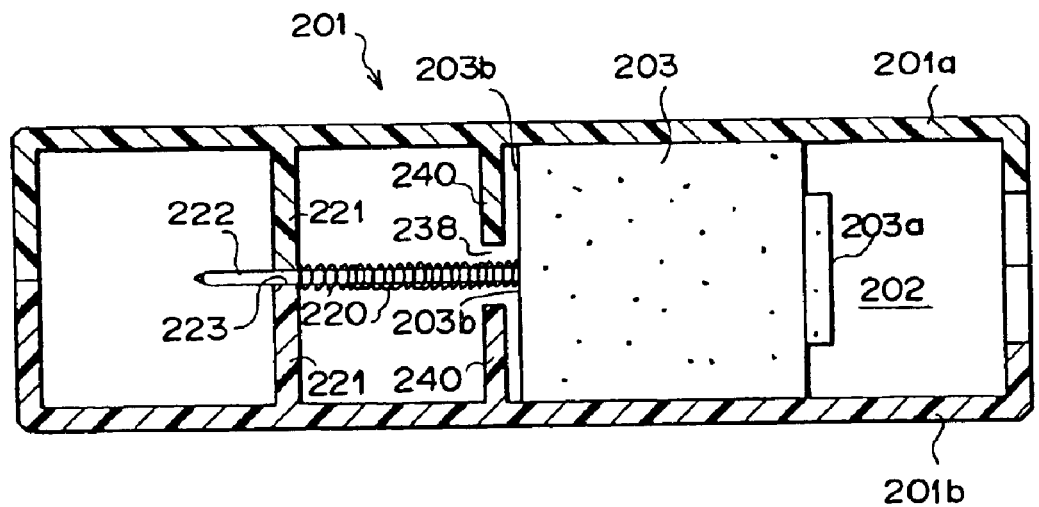
FIG. 26 is a diagrammatic sectional view of the open state of the slide door taken along line XXV—XXV of FIG. 24.
Figure 27A:
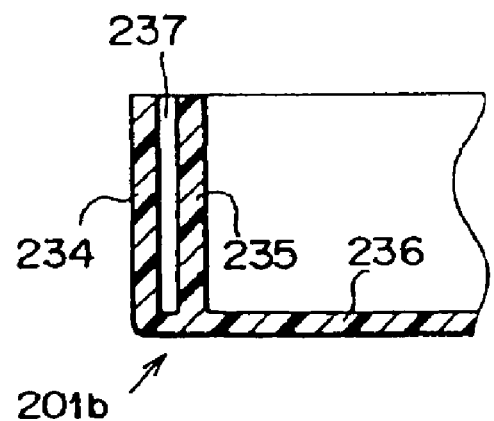
FIGS. 27A and 27B are sectional views taken along line XXVIIA—XXVIIA of FIG. 24.
Figure 27B:
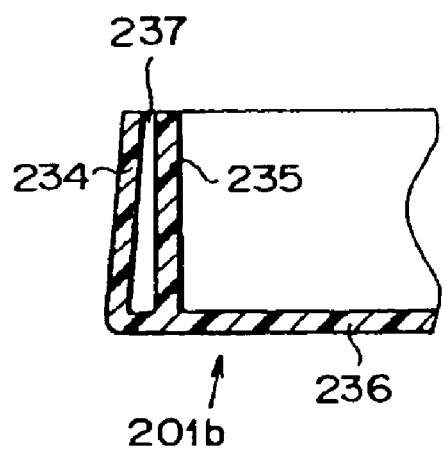
Figure 27C:
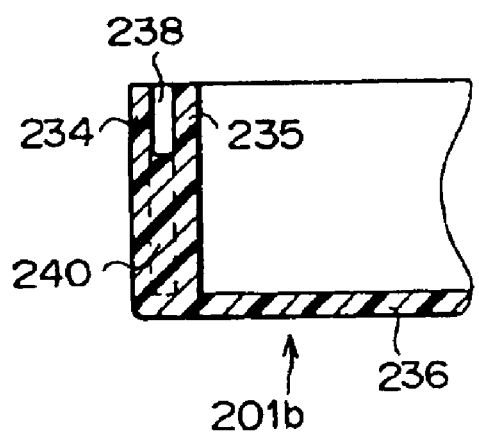
FIG. 27C is a sectional view taken along line XXVIIC—XXVIIC of FIG. 24.

Note that for simplifying the drawings, in FIG. 24 the structure for urging the slide door is omitted and in FIGS. 25 and 26 the recess 206 and the remaining internal structure of the cartridge case 201 are omitted. FIGS. 27A and 27B show sectional views taken along line XXVIIA—XXVIIA of FIG. 24, and FIG. 27C shows a sectional view taken along line XXVIIC—XXVIIC of FIG. 24.

As shown in FIGS. 24 and 27, an exterior wall 234, equipped with the tape leader opening 202, and a generally circular interior wall 235 facing the exterior wall 234, rise independently from the edge portion of a bottom wall 236. Between the exterior wall 234 and the interior wall 235, a passageway 237 for moving the slide door 203 and a rear space that is an extension of the passageway 237 are formed.

The spring member 220, for urging the slide door 203 toward the closing position and holding it in that position, consists of a coil spring, as shown in FIGS. 25 and 26. The spring member 220 is disposed in the space between the rear surface 203b of the slide door 203 and a wall portion 221 behind the moving passageway 237 for the slide door 203, along the connecting surface between the upper and lower cases 201a and 201b, with the axis of the spring member 220 toward the sliding direction of the slide door 203. To prevent buckling of the spring member 220, a support shaft 222 extending rearward, for example, is attached to the rear surface 203b of the slide door 203. The spring member 220, consisting of a coil spring, is inserted on the support shaft 222.

In the wall portion 221 provided behind the moving passageway 237 for the slide door 203, a hole 223 is formed as a spring seat for allowing insertion of the rear end of the support shaft 222 when the slide door 203 is opened.

Just behind the moving passageway 237 for the slide door 203 between the upper and lower cases 201a and 201b, as is particularly clear from FIG. 27C, a rib 240 is integrally formed for connecting the exterior wall 236 on the side of the tape leader opening 202 and the interior wall 235. However, this rib 240 is provided, leaving behind a space 238 required for housing the spring member 220 consisting of a coil spring, and does not reach the connecting surface between the upper and lower cases 201a and 201b.

Thus, in the eighth embodiment, the exterior wall 234 on the side of the tape leader opening 202 and the interior wall 235 facing the exterior wall 234 are connected by the rib 240. Therefore, this embodiment can prevent a tilt of the exterior wall such as that shown in FIG. 27 when the upper and lower cases 201a and 201b are manufactured by injection molding.

Embodiments of the present invention for achieving the aforementioned third object will hereinafter be described in detail with reference to the drawings.

Figure 28:
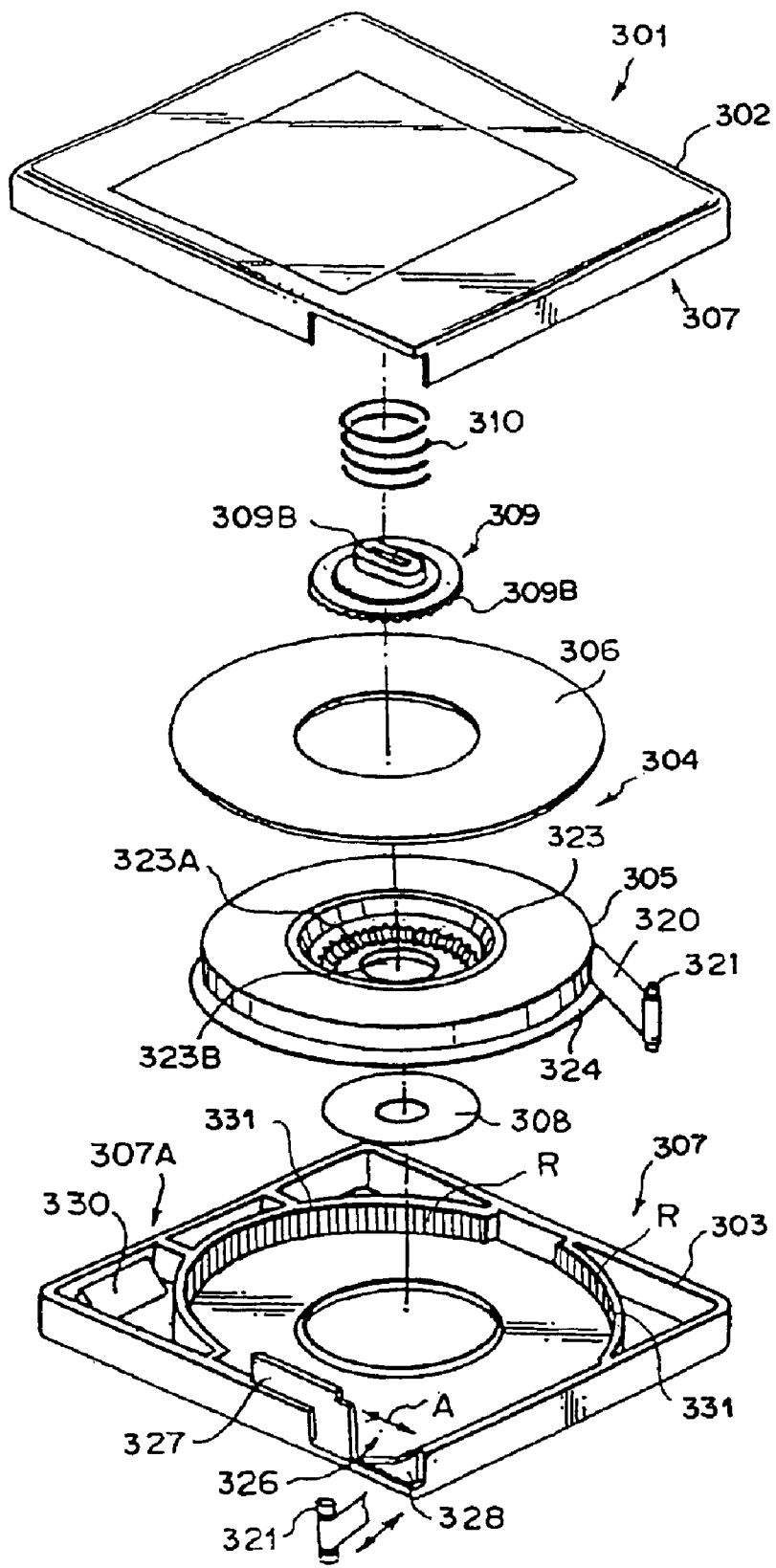
FIG. 28 is an exploded perspective view showing the construction of a ninth embodiment of the present invention.
Figure 29:
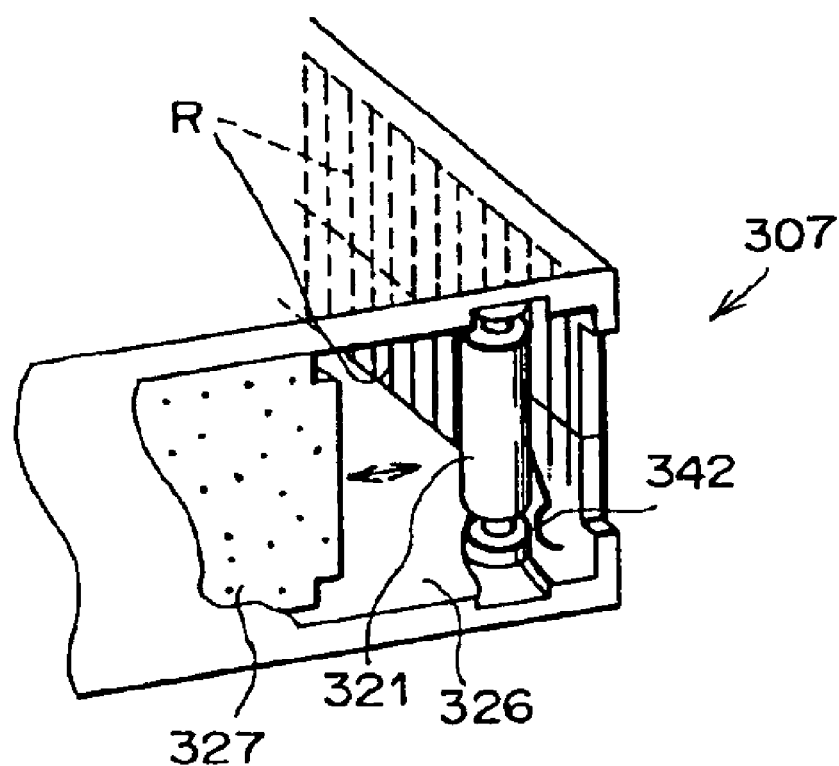
FIG. 29 is a perspective view, partly broken away, showing the essential part of the cartridge case of FIG. 28.

FIG. 28 is an exploded perspective view showing the construction of a ninth embodiment of the present invention. FIG. 29 is a perspective view, partly broken away, showing the essential part of the cartridge case of FIG. 28.

As shown in FIG. 28, the magnetic tape cartridge 301 is equipped with a hard-plastic flat cartridge case 307, which is constructed by fastening a lower case 303, which has a square flat shape, and an upper case 302, which has a flat shape similar to the lower case 303 and is stacked on the top of the lower case 303, together at four corners thereof by fastening means such as small screws, etc. Within this cartridge case 307, a single reel 304 with magnetic tape 320 wound thereon is rotatably housed.

The reel 304 has a construction in which a lower reel 305 and an upper reel 306 are joined together by ultrasonic welding. The lower reel 305 has a cylindrical reel hub 323 with the magnetic tape 320 wound on the outer periphery, and a flange portion 324 protruding radially from the lower end of the reel hub 323. The reel hub 323 and the flange portion 324 are integrally molded from synthetic resin. The exterior surface of the bottom portion of the reel hub 323 is provided with a reel plate 308 for engaging with a magnet type rotation means that drives the reel 304 to rotate. The interior surface of the bottom portion of the reel hub 323 is provided with a restraining gear 323A which engages with a restraining gear 309A formed in a brake button 309 to restrict rotation during non-use. Also, the reel hub 323 has an opening 323B. A drive releasing spindle, provided in an external recording-reproducing unit that uses the magnetic tape cartridge 301, is inserted into the opening 323B of the reel hub 323 and moves the brake button 309 upward.

The brake button 309 is provided, on a side facing the reel hub 323, with the aforementioned restraining gear 309A and on the opposite side with a fitting groove 309B into which a brake guide protrusion formed in the upper case 302 is fitted. When the cartridge is not used, the brake button 309 is urged downward by a coil spring and fitted into the reel hub 323. In this state, the restraining gear 309A of the brake button 309 meshes with the restraining gear 323A of the reel hub 323, whereby rotation of the reel 4 is prevented. When, on the other hand, the cartridge is used, the drive releasing spindle of the recording-reproducing unit presses the brake button 309 and moves the brake button upward against the urging force of the coil spring 310. This movement releases the engagement between the restraining gears 309A and 323A and allows the reel 304 to rotate.

In one side wall of the cartridge case 307, an opening 326 is formed for pulling out the magnetic tape 320 from the cartridge case 307. In the opening 326 there is provided a slide door 327 which is slidable in the direction of arrow A parallel to the side wall of the cartridge case 307. The slide door 327 is urged by a spring (not shown) in the direction of closing the opening 326.

When the magnetic tape cartridge 301 is not used, the magnetic tape 320 is completely wound on the reel 304, and the leader pin 321 (leader means) attached to the end portion of the magnetic tape 320 is retained in a recess 328 formed near the opening 326.

The leader pin 321 is used for holding and introducing the magnetic tape 320 into a tape running path provided within a recording-reproducing unit which uses the magnetic tape cartridge 310. Because of this, a spring member 342 (see FIGS. 29 and 37) is provided as a retaining member for detachably retaining the leader pin 321 in the aforementioned recess 328.

If the magnetic tape cartridge 301 is loaded into a corresponding external recording-reproducing unit, the engagement between the restraining gears 309A and 323A of the brake button 309 and reel hub 323 is released and the reel 304 is allowed to rotate, as described above. In addition, the magnet type rotation means engages with the reel plate 308 and rotates the reel 304. At the same time, the slide door 327 is opened and the leader pin 321 is pulled in and to a predetermined position on the tape running path. In this manner, data can be read from or written to the magnetic tape 320.

A corner portion 307A within the cartridge case 307 is provided with a non-contact type memory-in-cartridge (hereinafter referred to as MIC) 330 for recording the contents of information stored on the magnetic tape 320. The MIC 330 consists of a rectangular plate member and is capable of reading and writing information without contact by a method of electromagnetic induction, etc.

Within the cartridge case 307, a rib 331 in the form of a circular arc coaxially surrounds the magnetic tape 320 wound on the reel 304 and is projected from the top wall of the upper case 302 and the bottom wall of the lower case 303. The interior wall surface of the rib 331 is knurled as shown by R. The interior wall surface of the side wall, near the tape leader opening 326, of the cartridge case 307 is also knurled as shown by R in FIG. 29.

Thus, in the ninth embodiment, the interior wall surface of the rib 331 and the interior wall surface of the side wall near the opening 326 are knurled. This makes it possible to prevent the magnetic tape 320 from being attached to the interior wall surface of the cartridge case 307 by static electricity.

The aforementioned object is also achieved by performing an antistatic process on the slide door 327, or a sliding part near the tape leader opening 326, such as an interior wall surface of the cartridge case 307 along which the leader pin 321 slides. This antistatic process can be performed by applying an antistatic agent to the aforementioned sliding part, or forming the sliding part from material containing an antistatic agent.

Figure 30:
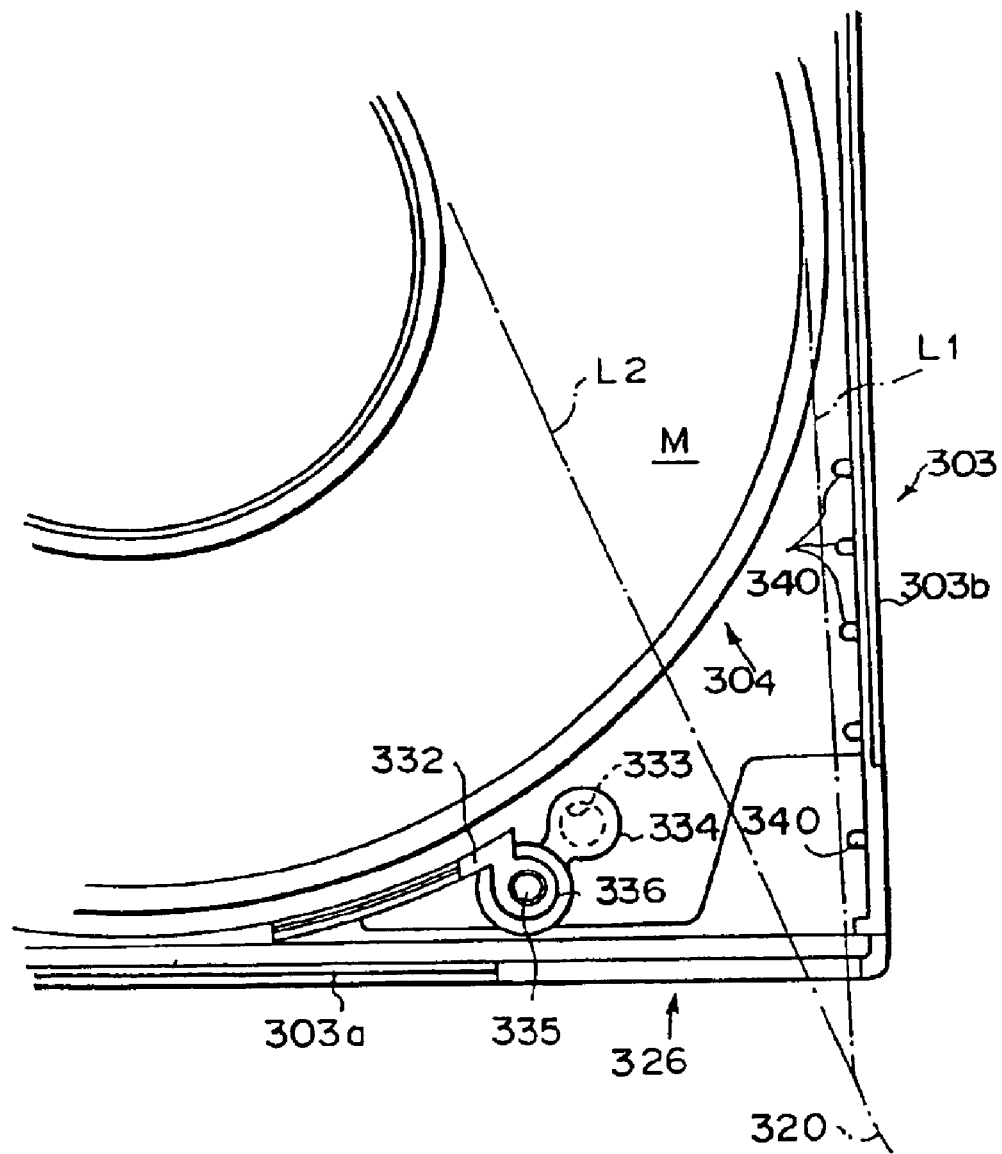
FIG. 30 is an enlarged plan view of the essential part of a lower case according to a tenth embodiment of the present invention.
Figure 31:
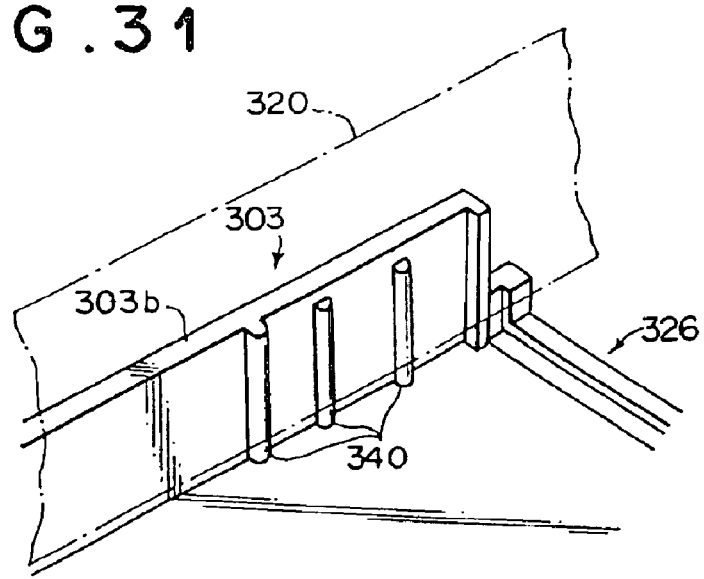
FIG. 31 is a diagrammatic perspective view of the essential part of the lower case of FIG. 30.
Figure 32:
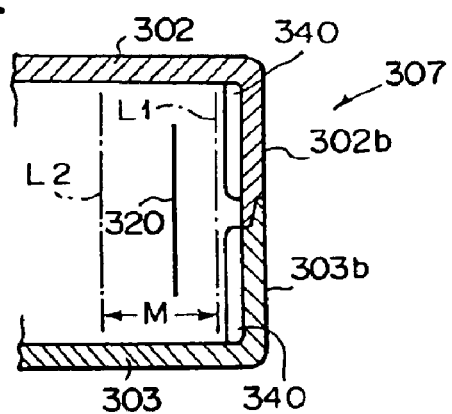
FIG. 32 is a sectional view of the essential part of a cartridge case employing the lower case of FIGS. 30 and 31.
Figure 36:
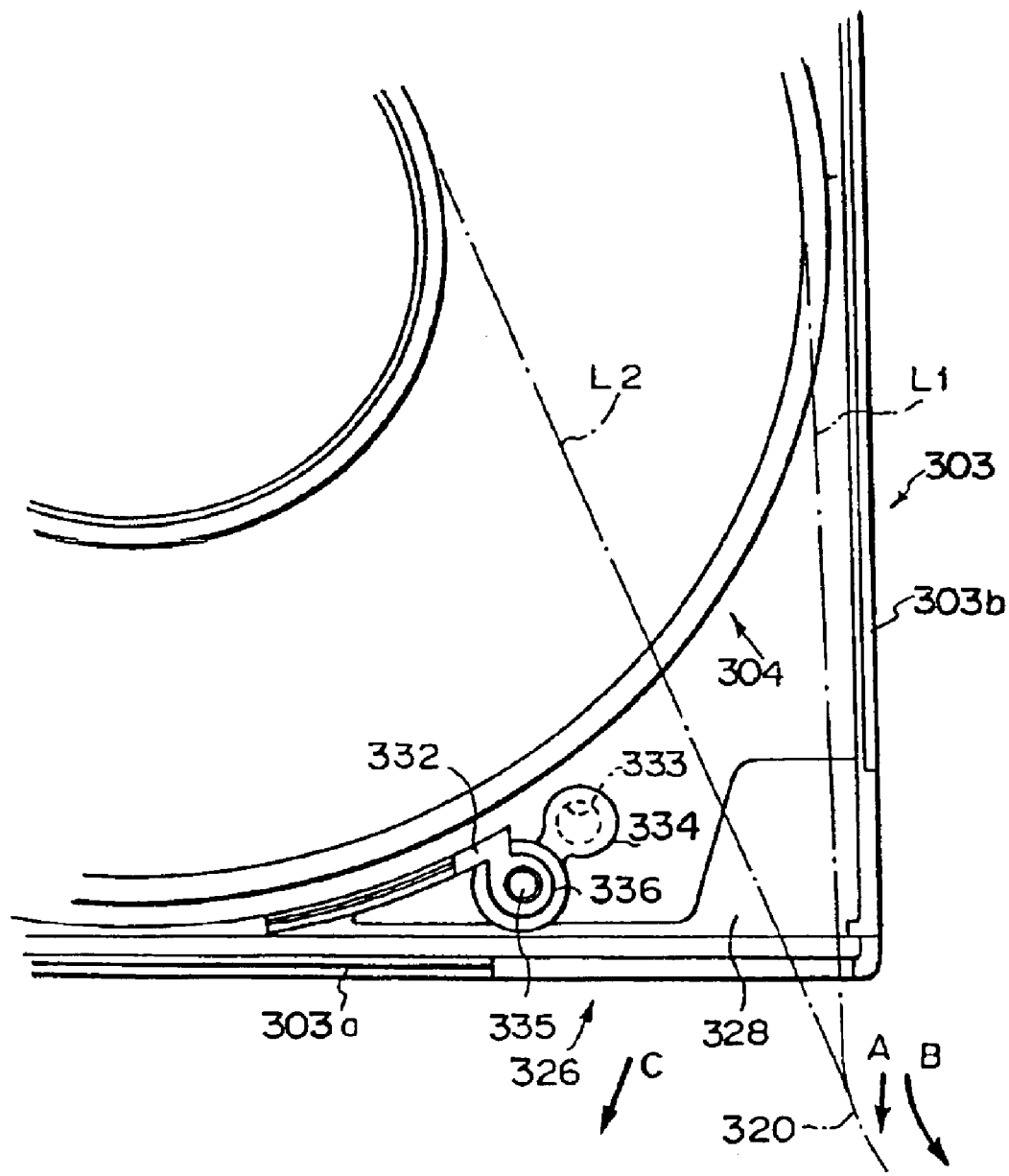
FIG. 36 is an enlarged plan view of the essential part of the lower case of another conventional cartridge case.

FIG. 30 is an enlarged plan view, of the essential part of a lower case corresponding to FIG. 36, showing a tenth embodiment of the present invention. FIG. 31 is a diagrammatic perspective view of the essential part of the lower case of FIG. 30, and FIG. 32 is a diagrammatic sectional view of the essential part of a cartridge case.

In the tenth embodiment, the interior wall surface of the side wall (in the case of an upper case 302, a side wall 302b, and in the case of a lower case 303, a side wall 303b) of the cartridge case 307 is provided with a plurality of vertical ribs at predetermined intervals along the side walls 302b and 303b. These ribs are provided in a region other than a tape running region defined by boundary lines L1 and L2, and near the tape leader opening 326 in a region defined by both the boundary line L1 on the maximum tape winding diameter side of a tape running region M and the side walls 302b and 303b of the cartridge case 307 near this boundary line L1.

Note that in FIG. 30, the same reference numerals are applied parts corresponding to FIG. 36 for avoiding redundancy, as FIG. 30 is the same as FIG. 36 except that the ribs 340 are provided.

The tenth embodiment is capable of preventing the magnetic tape 320 from being attached to the side walls 302b and 303b of the cartridge case 307 by providing the ribs 340.

Figure 33:
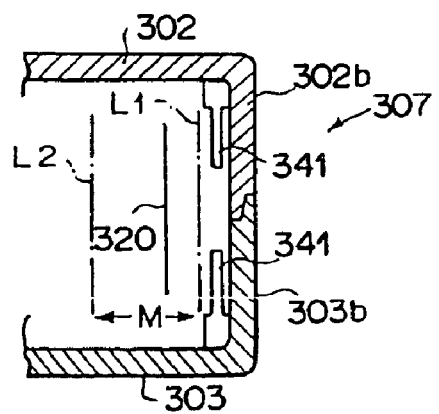
FIG. 33 is a sectional view of the essential part of an alternation of the cartridge case of FIG. 32.
Figure 35:
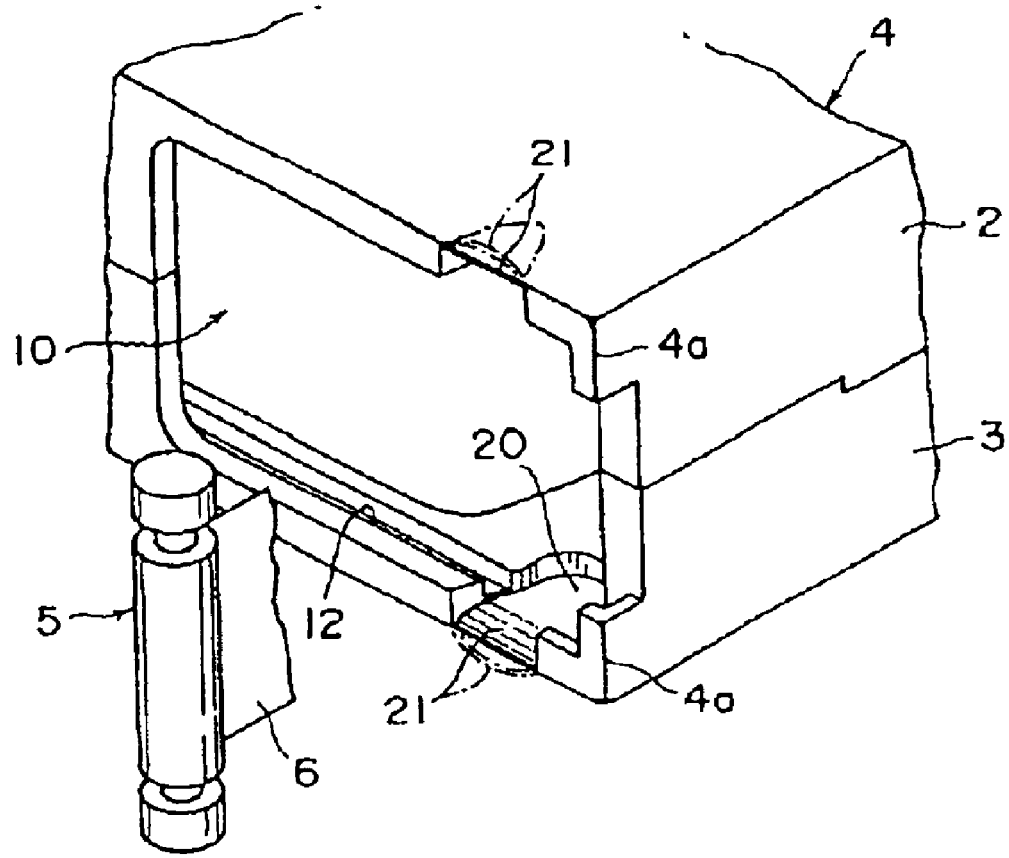
FIG. 35 is a perspective view of the essential part of a conventional cartridge case.

FIG. 33 is a diagrammatic sectional view of the essential part of modification of the cartridge case of FIG. 32.

In FIG. 33, bosses 341 extend from the top wall of the uppercase 302 and bottom wall of the lowercase 303 of the cartridge case 307 and are provided along the interior wall surfaces of the side walls 302b and 303b. These bosses 341, as with the aforementioned ribs 340, are provided in a region other than the tape running region M, and near the tape leader opening 326 in a region defined by both the boundary line L1 on the maximum tape winding diameter side of the tape running region M and the side walls 302b and 303b of the cartridge case 307. It is clear that these bosses 341 are also capable of preventing the magnetic tape 320 from being attached to the side walls 302b and 303b of the cartridge case 307.

FIG. 34 shows a construction in which the rib or boss is also used as a rib or boss for fixing a member which retains the leader pin 321. In the case of FIGS. 28 and 29, the spring member 342, which serves as a retaining member for detachably and elastically supporting the upper and lower ends of the leader pin 321 attached to the end portion of the magnetic tape 320, is attached to the upper and lower cases 302 and 303 so that it faces the tape leader opening 326. However, in the construction shown in FIG. 34, the proximal portion of the spring member 342 is retained by a rib 340 having a hook-shaped cross section, and the intermediate portion of the spring member 342 is retained within the gap between a boss 341 and the interior wall surface of the side wall 303b.

What is claimed is:

1. A magnetic tape cartridge comprising:

a cartridge case in which a single reel with magnetic tape wound thereon is rotatably housed; and a slide door, urged in a closing direction by a coil spring member, which opens and closes a tape leader opening for pulling out one end of said magnetic tape;

wherein a rib is provided for connecting an exterior wall, on the side of said tape leader opening, behind a passageway along which said slide door slides, and an interior wall facing said exterior wall.

2. The magnetic tape cartridge as set forth in claim 1, wherein ribs or bosses are provided in a region, other than a tape running region and near said tape leader opening in a region, defined by both a boundary line on a maximum tape winding diameter side of said tape running region and a side wall of the cartridge case near said boundary line.

* * * * *